(12) United States Patent
Morrow

(10) Patent No.: US 6,941,405 B2
(45) Date of Patent: Sep. 6, 2005

(54) SYSTEM AND METHOD CAPABLE OF OFFLOADING CONVERTER/CONTROLLER-SPECIFIC TASKS TO A SYSTEM MICROPROCESSOR

(75) Inventor: Neil Morrow, San Jose, CA (US)

(73) Assignee: 02Micro International Limited, Grand Cayman (KY)

(*) Notice: Subject to any disclaimer, the term of this patent is extended or adjusted under 35 U.S.C. 154(b) by 363 days.

(21) Appl. No.: 10/179,678

(22) Filed: Jun. 24, 2002

(65) Prior Publication Data

US 2003/0046472 A1 Mar. 6, 2003

Related U.S. Application Data

(63) Continuation-in-part of application No. 10/044,521, filed on Jan. 10, 2002, now abandoned.

(51) Int. Cl.$^7$ .............................................. G06F 13/14
(52) U.S. Cl. ....................... 710/305; 710/306; 710/313; 710/314; 710/315; 710/310; 713/2
(58) Field of Search ................................. 710/305–306, 710/310–317, 36–39, 8–19, 62–64, 72, 300–304, 104–106; 713/1–2; 361/737

(56) References Cited

U.S. PATENT DOCUMENTS

| | | | | |
|---|---|---|---|---|
| 6,010,066 A | * | 1/2000 | Itou et al. ..................... 235/379 |
| 6,097,605 A | * | 8/2000 | Klatt et al. ................... 361/737 |
| 6,128,675 A | * | 10/2000 | Ko ................................ 710/23 |
| 6,438,638 B1 | | 8/2002 | Jones et al. .................. 710/301 |
| 6,684,283 B1 | * | 1/2004 | Harris et al. ................. 710/302 |
| 6,718,274 B2 | * | 4/2004 | Huang et al. .................. 702/64 |
| 6,738,259 B2 | * | 5/2004 | Le et al. ....................... 361/737 |
| 2001/0053701 A1 | | 12/2001 | Hattori ......................... 455/550 |

* cited by examiner

Primary Examiner—Paul R. Myers
Assistant Examiner—Raymond N Phan
(74) Attorney, Agent, or Firm—Grossman, Tucker, Perreault & Pfleger, PLLC

(57) ABSTRACT

Systems are provided for the offloading of protocol control and conversion information within microprocessor-based systems. A converter controller comprises a first interface and protocol, as well as a second interface and protocol. An intermediate protocol and interface is interconnected to both the first protocol and the second protocol, and forwards or offloads protocol information to the system CPU, which comprises device driver information for protocol conversion and/or control. The CPU acts upon the received protocol information, performs protocol conversion as necessary, and forwards the converted protocol information back to the converter controller through the intermediate interface. Some embodiments of the offloading protocol conversion system comprise a SDIO controller within a USB-based device.

45 Claims, 23 Drawing Sheets

(TYP) - Typical Implementation $x_1, x_2, x_3, x_4$ : Tolerances for Clearances, Warpage, etc.
$Z$ : Height of Connector Face $x_1, x_2, x_3, x_4$ : Tolerances for Clearances, Warpage, etc.
Z : Height of Connector Face
$l_1, l_2$ : Offsets from SmartMedia opening edges

SYSTEM AND METHOD CAPABLE OF OFFLOADING CONVERTER/CONTROLLER-SPECIFIC TASKS TO A SYSTEM MICROPROCESSOR

CROSS-REFERENCE TO RELATED APPLICATIONS

This application claims priority to U.S. Provisional Patent Application Ser. No. 60/314,107 filed 21, Aug. 2001, and is a Continuation-In-Part to U.S. Utility patent application Ser. No. 10/044,521, filed 10, Jan. 2002 now abandoned.

FIELD OF THE INVENTION

The invention relates to protocol conversion and function control for devices in a microprocessor-based system. More particularly, the invention relates to the offloading of converter/controller-specific tasks to the system microprocessor.

BACKGROUND OF THE INVENTION

FIG. 1 is a schematic view 10 of a typical implementation of a converter/controller device 14 within a computer system platform 12. A central processing unit (CPU) 18, along with associated random access memory (RAM) 22, and read only memory (ROM) 24 are typically connected to other elements of the host system 12, through platform logic 20, to a bus architecture 26.

The platform logic 20 comprises bus interface logic and memory control logic, and is typically incorporated into one or two chips, called a "chipset". In some cases, the chipset 20 is integrated within the CPU device 18. Typically, the chipset 20 further comprises the bus architecture 26, which comprises one or more bus interfaces 28a,28b,28c that are commonly used to connect additional platform components 16 to complete the desired function of the platform 12.

FIG. 1 also shows a conventional protocol converter/function controller 14, which is embedded on the computing system platform 12. The protocol converter/function controller device 14 communicates to the operating system and other software components associated with the CPU 18, through the bus architecture 26, using the first electrical interface 30 and first protocol 32, and communicates with one or more end functions 16, using a second protocol B 36 and electrical interface B 34.

The protocol converter and function controller device 14 is connected, by the first electrical interface A 30 and first protocol 32, to the platform logic 20 associated the CPU 18, through the bus architecture 26, comprising electrical signals on one or more of the bus interfaces 28a,28b,28c.

The end function 16 of a component associated with or soldered to the platform 12 may be one of the many functions desirable by the user of the computer system platform 12. For example, the end function 16 may typically comprise a disk drive or other storage interface, a network interface, an audio or video user interface, a human input device interface, a data acquisition interface, or an alternate bus interface, which acts as a bridge or router. The end function 16 may alternately comprise a wireless connectivity endpoint. For end functions 16 which are embedded in the converter/controller device 14, the protocol B 36 and electrical interface B 34 may not be visible or accessible outside the converter/controller device 14.

The on-board converter/controller device 14 is connected through input/output terminals 15 to the bus interface 26, and provides function control and/or protocol conversion between the CPU 18 and one or more end functions 16. The converter/controller device 14 is a connected component within the platform 12, and comprises an additional component within the platform material list. The converter/controller device 14 is typically soldered to the platform 12, or mated to the platform bus interface through a bus interface-specific expansion connector, e.g. such as through a PCI bus slot.

The first electrical interface 30 is typically connected to one of the system bus interfaces 28, e.g. such as through bus interface X 28a, such that the operating system, device drivers, and other software components, which are typically executed from either RAM 22 or ROM 26, can identify the on-board converter/controller device 14, and load the appropriate device drivers.

The layer of software that interacts directly with hardware logic in the on-board converter/controller device 14 is the device driver. Device drivers use a device specific protocol to communicate with the on-board converter/controller device 14, which may be either an industry standard protocol, or a vendor-unique protocol, depending on the design of the protocol support logic 32 for the converter/controller device 14. The supported protocols are typically indicated to the operating system, to when the operating system detects the device presence in the system bus interface 26, such as through plug and play mechanisms.

The on-board converter/controller device 14, as shown in FIG. 1, includes an embedded microprocessor 38, which provides conventional electrical and/or protocol conversion, within the converter/controller device 14. Similarly, alternate computer systems have previously provided microprocessor-less converter/controller designs, which interface from a first protocol 32 and electrical interface 30 to a second protocol 36 and electrical interface 34, e.g. such as by performing protocol conversion in state machines and logic elements integrated in the converter/controller device 14.

The first electrical interface A 30 typically comprises a state machine, which controls the bus interface specific signals used to transmit and receive data elements. For example, electrical interface A may handle raw data transfer over PCI, ISA, USB, IEEE1394, PCMCIA, RS232-UART, 3GIO (PCI Express), SPI, MultiMediaCard (MMC), SmartMedia, SD Memory Card, SDIO, Memory Stick, ISO7816 (Smart Card), Serial ATA, Parallel Port, IDE, or any other wired bus interface 26. The first electrical interface A 30 may also handle raw data transfer over wireless interfaces such as through BLUETOOTH™ technology, as defined by Bluetooth Special Interest Group (SIG). A wireless first electrical interface A 30 typically comprises transceiver circuitry being capable of transmitting and receiving raw data over the bus interface, including any wireless transceiver components that may be necessary. The first protocol A support logic 32 comprises the method by which raw data transferred through the first electrical interface A 30. The protocol support logic 32 typically includes a set of registers and that communicate information about raw data elements, such as the source of the data, the destination of the data, and the format of the data. The protocol support logic 32 may include methods that manipulate raw data, e.g. such as performing cryptographic functions upon the raw data. The protocol A support logic 32 may be simply a data buffer large enough to contain both raw data and the information about the raw data. Protocol A 32 can be any protocol or combination of protocols that gives meaning to raw data that is sourced from or destined to the end function 16, e.g. such as ATA/ATAPI, SBP-2, and/or TCP/IP. The protocol A support logic 32 in FIG. 1 represents all hardware state machines, logic elements, and data buffering implemented in the converter/controller device 14 which support these protocols.

The second end function protocol support logic 36 provides hardware elements necessary to support the protocols which give meaning to raw data elements transmitted and received using the second electrical interface 34. Protocol B may be a standardized protocol for communicating with the end function 16, or it may be specific to the end function. For example, protocol B for a converter/controller device used to connect Memory Stick cards to platform 12 is specified in the Memory Stick Standard. In this example, the electrical interface B 34 is also specified in the Memory Stick Standard.

The embedded microprocessor 38, within the controller 14, has dedicated firmware program ROM 40 and data ROM 42. The embedded microprocessor 38 typically receives commands within 1394-SBP2 protocol 32, and converts the commands to USB storage device class bulk transfer protocol 36.

A general purpose USB-based function controller 14, such as Part No. TUSB3210, available through Texas Instruments, Inc., is one example of an embedded microprocessor function controller 14. As seen in FIG. 1, firmware ROM 40 and data RAM 42 are associated with the embedded micro-processor 38. The TUSB3210 device 14 comprises an integrated 8052 core microprocessor 38, and several RAM and ROM components 40,42.

Microsoft Corp., Small Form-Factor I/O Devices for Windows, describes conventional protocol conversion through embedded microprocessors. Electrical conversion and USB mass storage control are typically achieved with such embedded micro-controller designs, such as with a TUSB3210 function controller 14.

The embedded microcontroller, i.e. microprocessor, 38 is a peripheral device to the CPU 18, which offloads CPU instructions to provide dedicated protocol conversion. However, while the peripheral microcontroller 38 offloads such tasks from the CPU 18, there is a substantial cost and complexity associated with a peripheral microprocessor 38.

In alternate prior system platforms, in which the microprocessor 38 is embedded within the system 18,20, the embedded microprocessor 38 is still a discrete device, having a similar design to a peripheral processor 38, and similarly off-loads processing tasks from the CPU 18.

While prior art protocol conversion has provided an increase in overall system speed, for earlier CPUs 18 having limited processing capabilities, current CPUs 18, such as Intel Pentium 4™ microprocessors 18, provide substantially more processing capabilities than earlier microprocessors 18, such that there is often a surplus of processing capacity.

The converter controller 14 shown in FIG. 1 comprises an embedded microprocessor 38 to provide protocol conversion. In alternate converters/controllers 14 without an embedded microprocessor 38, the design complexity is directly related to the complexity of the protocol conversion tasks. In addition, such microprocessor-less converter/controllers 14 rely on hardware state machines and logic which are typically not upgradeable to support new protocols or electrical interface changes. For simple converter/controller devices, this type of microprocessor-less architecture may be sufficient.

It would be advantageous to perform efficient protocol conversion for a computing system platform, such that conversion and control processing is performed in a cost and time efficient manner. It would also be advantageous to perform protocol conversion for a computing system platform, such that conversion and control processing is offloaded to the central processing unit.

Microprocessor-based devices, such as desktop computers, laptop computers, personal digital assistants (PDAs), and/or mobile phones often comprise a connection to flash media, such as to a Memory Stick™, to a SmartMedia™ card, or to MMC/SD media. Flash media is typically installed within a flash media port, either directly into the microprocessor device, or through an intermediate adapter, having a socket connector. Card detect (CD) signals are very common in socket connectors, to indicate to the system when a card, e.g. such as a Memory Stick™ card, by Sony Electric Co., Inc., has been inserted. For common flash media connectors, the card detect signals, e.g. CD#, are typically active low.

FIG. 2 shows a media adapter system 50 adapted to receive different flash media 60a, 60b, 60c, 60d having different formats. A dedicated Memory Stick™ passive adapter 58a comprises a socket connector 68a to establish contact with corresponding contacts on the Memory Stick™ 60a, and further comprises host, i.e. system, connections 66a to establish contact with a PC card controller 54 through corresponding contacts, such as through a card bay socket interface 56. Similarly, a dedicated SmartMedia passive adapter 58b comprises a socket connector 68b to establish contact with corresponding contacts on the SmartMedia card 60b, and further comprises host connections 66b to establish contact with a PC card controller 54 through a corresponding contact interface 56.

In FIG. 2, an MMC/SD passive adapter 58c comprises a 2-in-1 socket connector 68c, to establish contact with corresponding contacts on either an MMC card 60c or an SD card 60d, and further comprises host connections 66c to establish contact with a PC card controller 54 through corresponding contacts. Since there are only slight differences in the form factor and required software between an MMC card 60c and an SD card 60d, some passive adapters 58c can provide connections to either an MMC card 60c, or to an SD card 60d, without a query process to distinguish the type of connected media card 60c,60d. The functional extensions of SD cards 60d beyond MMC capabilities are provided by a shared protocol which comprises responses from the media in response to requests from the host 52.

Therefore, the PC card controller 54 supports a single flash media 60 through a dedicated passive adapter 58. For example, the PC card controller 54 shown in FIG. 2 supports Memory Stick™ flash media 60a through a Memory Stick™ passive adapter 68a, SmartMedia™ flash media 60b through a SmartMedia™ passive adapter 68b, and either MMC media 60c or SD flash media 60d through a MMC/SD passive adapter 68c.

As seen in FIG. 2, the PC card controller 54 typically supports a single type of flash media 60, e.g. 60a, through a passive adapter 58, e.g. 58a, except for media types that share a command electrical interface, such as for MultiMedia Cards 60c and SD cards 60d.

In the prior art, a signal, e.g. such as an MC_CD# signal, is used to identify when a flash media card 60 is inserted into a dedicated, i.e. format specific, passive adapter 58. While a query mechanism is sometimes used to identify which type of flash media 60 is supported by a connected passive adapter 60, e.g. for a SmartMedia™ adapter 58b, such a query process only provides query values that correspond to a single media type, e.g. corresponding to a SmartMedia™ card 60b and a SmartMedia™ adapter 58b.

While an adapter system 50 as seen in FIG. 2 can be used to interface with flash media 60 having different formats, dedicated adapters 58 are used to interface with flash media 60 respectively. A user who desires to alternatively connect more than one flash media 60, i.e. having different command interfaces, to a host system 12, through a PC Card socket 46, is therefore required to acquire and use multiple passive adapters 58.

While the media adapter system shown in FIG. 2 may provide a query process to conform the type of flash media 60, e.g. 60*a*, supported by a connected passive adapter 58, such as 58*a*, such a process is limited to activate only one flash media interface at any time.

After the media 60 has been inserted into the adapter 58, and the MC_CD# signal is asserted, and a SQRYDR signal is typically driven by the PC card controller 54. The SQRYDR signal is used as a voltage source during the query process. After the SQRYDR signal is activated, the SQRYx signals can be read. Therefore, the SQRYx signals are only read one time per MC_CD# assertion. Since there is only one MC_CD# signal in the system 10 shown in FIG. 2, the architecture is limited in that one notification is given that a card is inserted into a passive adapter, with card detect signals that independently notify the host system when cards are plugged into the corresponding sockets. Therefore, only one flash media electrical interface can be activated through the passive adapter 58 at any time.

It would be advantageous to provide card bay architecture which supports a passive adapter that interfaces with multiple flash media types, and provides both card insertion and multiple media format determination. It would also be advantageous to provide a 3-in-1 connector for SD Card, Multimedia™ Card, and SmartMedia™ interfaces.

Furthermore, it would be advantageous to provide a PC card controller which integrates flash media reader technology. Such a system would be a major technological breakthrough. It would also be advantageous to provide a PC card controller which integrates flash media reader technology, which supports a flash media adapter comprising passive componentry. Furthermore, it would be advantageous to provide an PC card controller which integrates flash media reader technology in conjunction with a flash media adapter comprising passive componentry, to minimize the cost of the flash media adapter. Such a system would be a further technological breakthrough.

It would also be advantageous to provide a query process which corresponds with flash media type, in conjunction with a passive adapter that supports more than one type of media, such as by connecting typical CD# signals to SQR5:3 signals (FIG. 10), to indicate the type of media in the socket of a passive adapter.

Socket connectors, such as Yamaichi Series No. FRS001 connectors, provide a 2-in-1 card bay connection to both SmartMedia card 60*b* and to an SD card 60*c*. However, while other cards 20, such as MMC cards 60*c* may physically be inserted into the card socket 28 of such an adapter, an MMC card 60*c* may become stuck within the card socket. Such adapter connectors are therefore typically sold as 2-in-1 connectors, such that connection to an MMC card 60*c* is not supported by the adapter. While such adapter connectors are often provided with documentation and/or labeling to warn users that the adapter does not support an MMC card 60*c*, a user may still mistakenly attempt to connect an MMC card 60*c* to a host system through such a connector.

It would therefore be advantageous to provide an adapter connector to properly connect MMC flash 60*c*, in addition to cards having other formats, e.g. such as Memory Stick media 20*a*, SmartMedia™ 60*b*, and/or SD cards 60*c*. The development of such an adapter connector would constitute a major technological advance.

SUMMARY OF THE INVENTION

Systems are provided for the offloading of protocol control and conversion information within microprocessor-based systems. A converter controller comprises a first interface and protocol, as well as a second interface and protocol. An intermediate protocol and interface is interconnected to both the first protocol and the second protocol, and forwards or offloads protocol information to the system CPU, which comprises device driver information for protocol conversion and/or control. The CPU acts upon the received protocol information, performs protocol conversion as necessary, and forwards the converted protocol information back to the converter controller through the intermediate interface.

DETAILED DESCRIPTION OF PREFERRED EMBODIMENTS

Figure 3:
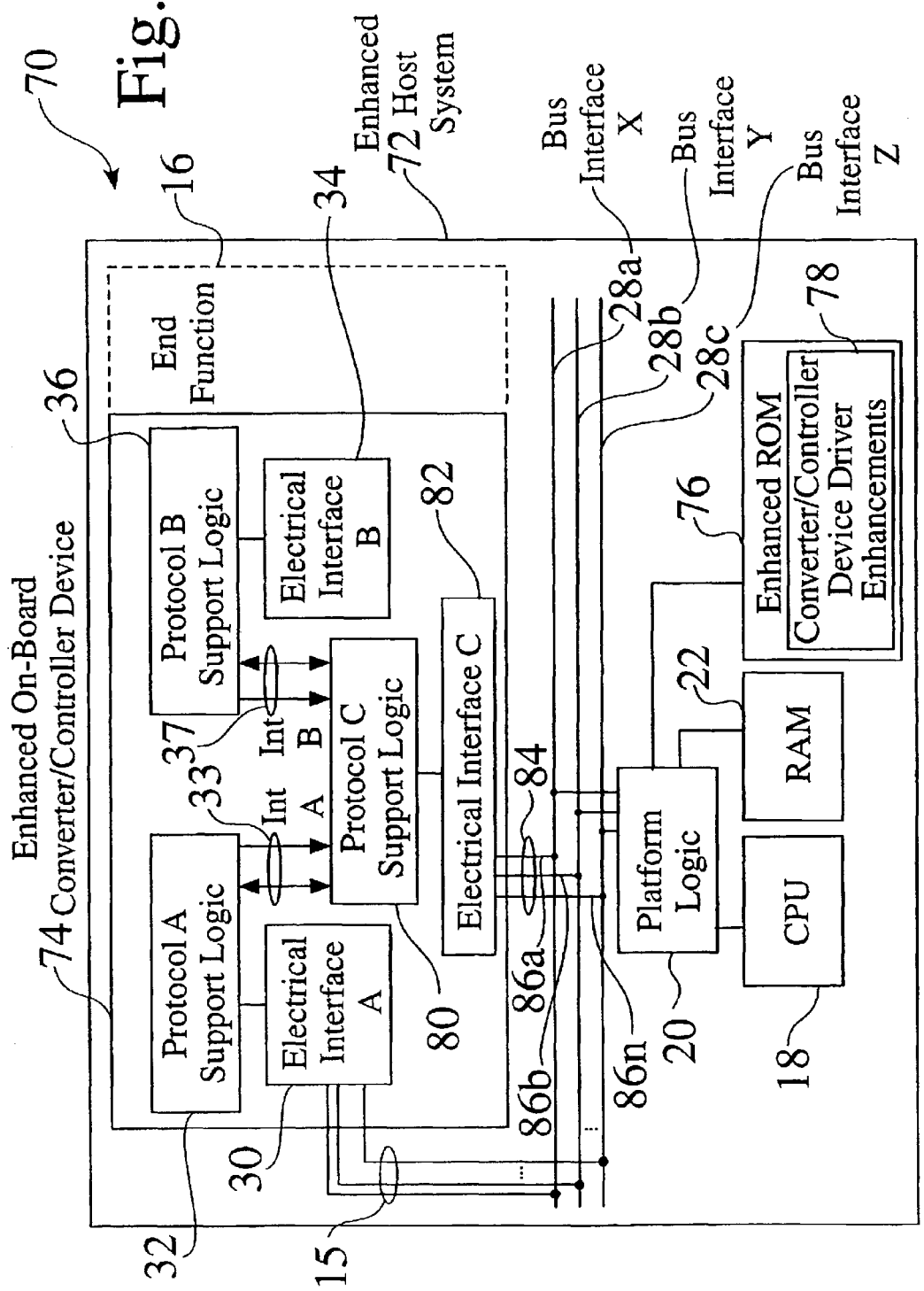
FIG. 3 is a schematic diagram of an enhanced system platform comprising an off-loading protocol interface.

FIG. 3 is a schematic diagram of an enhanced system platform 70 comprising an off-loading protocol 80 and interface 82. An enhanced converter/controller 74 comprises a third intermediate off-loading electrical interface 82, indicated as interface "C", which is typically connected to one or more bus interfaces 28a–28c, through terminals 84, comprising one or more connections 86a,86b,86c. The third interface 82 communicates with the platform CPU 18, using protocol C support logic 80, such that protocol control and conversion instructions 33,37 are offloaded and processed by the CPU 18 and ROM 76, which are supplemented by converter/controller device driver enhancements 78. The offloaded instructions 33,37 are added to the operating system, device driver and software tasks, represented by enhanced ROM 76 and converter/controller device driver enhancements 78.

The first electrical interface A 30 shown in FIG. 3 typically comprises a state machine which controls the bus interface specific signals used to transmit and receive data elements. For example, electrical interface A may handle raw data transfer over PCI, ISA, USB, IEEE1394, PCMCIA, RS232-UART, 3GIO (PCI Express), SPI, MultiMediaCard (MMC), SmartMedia, SD Memory Card, SDIO, Memory Stick, IS)7816 (Smart Card), Serial ATA, Parallel Port, IDE, or any other wired bus interface 26. The first electrical interface A 30 may also handle raw data transfer over wireless interfaces such as through BLUETOOTH™ technology, as defined by Bluetooth Special Interest Group (SIG). A wireless first electrical interface A 30 typically comprises transceiver circuitry being capable of transmitting and receiving raw data over the bus interface, including any wireless transceiver components that may be necessary.

The first protocol A support logic 32 shown in FIG. 3 comprises the method by which raw data transferred through the first electrical interface A 30. The protocol support logic 32 typically includes a set of registers and that communicate information about raw data elements, such as the source of the data, the destination of the data, and the format of the data. The protocol support logic 32 may include methods that manipulate raw data, e.g. such as performing cryptographic functions upon the raw data. The protocol A support logic 32 may be simply a data buffer large enough to contain both raw data and the information about the raw data. Protocol A 32 can be any protocol or combination of protocols that gives meaning to raw data that is sourced from or destined to the end function 16, e.g. such as ATA/ATAPI, SBP-2, and/or TCP/IP. The protocol A support logic 32 in FIG. 3 represents all hardware state machines, logic elements, and data buffering implemented in the enhanced converter/controller device 74 which support these protocols.

The second end function protocol support logic 36 shown in FIG. 3 provides hardware elements necessary to support the protocols which give meaning to raw data elements transmitted and received using the second electrical interface 34. Protocol B may be a standardized protocol for communicating with the end function 16, or it may be specific to the end function. For example, protocol B for a converter/controller device used to connect Memory Stick cards to platform 12 is specified in the Memory Stick Standard. In this example, the electrical interface B 34 is also specified in the Memory Stick Standard.

Figure 1:
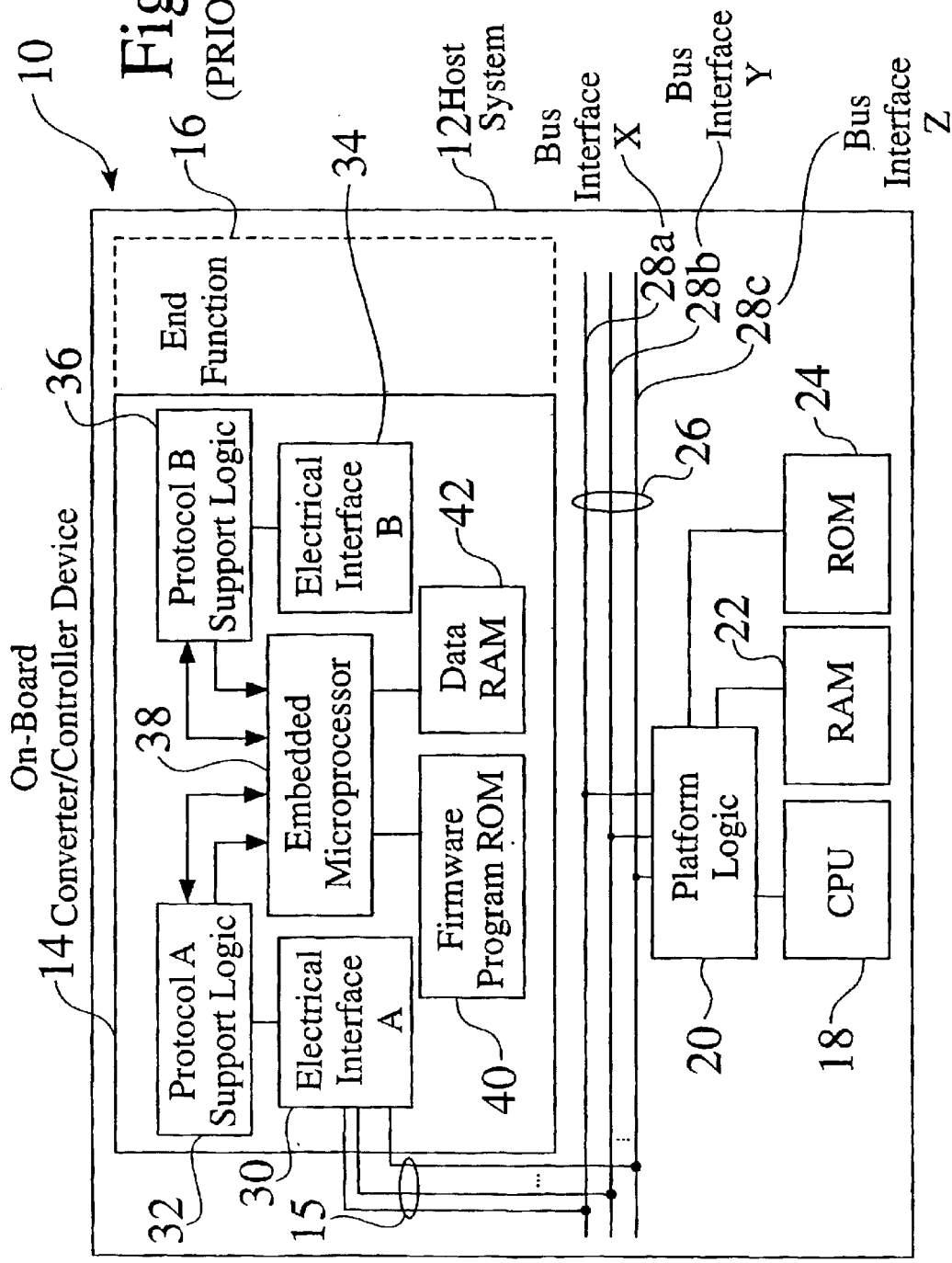
FIG. 1 is a schematic diagram of a conventional protocol converter or function controller embedded on a computing system platform.
Figure 2:
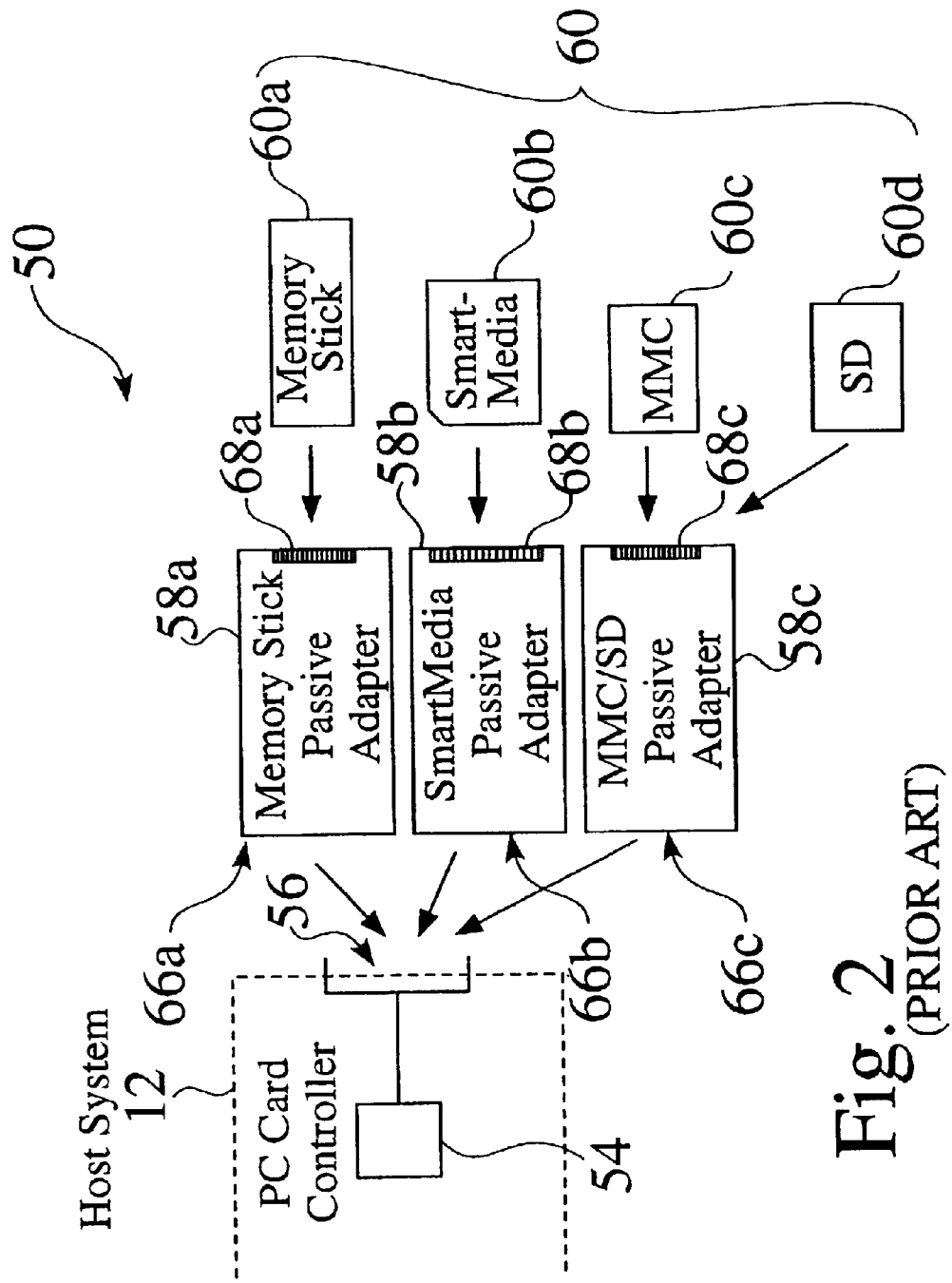
FIG. 2 shows a host system adapted to receive different flash media having different formats, wherein each of the different flash media has a dedicated flash memory adapter.

In contrast to a conventional protocol converter 14, as seen in FIG. 1, in which an embedded microprocessor 38 within the converter/controller device 14 executes protocol control and conversion instructions 33,37, in the enhanced protocol converter/controller device 74 shown in FIG. 3, the instructions 33,37 between the first electrical interface and protocol 30,32 and the second electrical interface and protocol 34,36 are executed by the CPU 18, through the third interface 82.

The enhanced protocol conversion system 70 allows instructions 33,37 related to converter/controller processing between the first protocol element 32 and the second protocol element 36 to be executed on the platform CPU 18, by means of the additional intermediate interface C 82. The use of the intermediate interface 82 allows the first electrical interface 30 and protocol 32 to be preserved for system platforms 72 using protocol conversion and control within the CPU 18.

The intermediate off-loading electrical interface 82 and intermediate protocol support logic 80 provides an additional interface, either logical or physical, to the enhanced converter/controller device 74, for the purposes of offloading instructions to the platform central processing unit 18. The intermediate off-loading electrical interface 82 typically comprises a standard interface connection 82, such as PCI, ISA, USB, IEEE1394, PCMCIA, RS232-UART, 3GIO (PCI Express), SPI, MultiMediaCard (MMC), SmartMedia, SD Memory Card, SDIO, Memory Stick, ISO7816 (Smart Card), Serial ATA, Parallel Port, IDE, or any other bus interface 82. The electrical interfaces 30 and 82 are shared in some preferred embodiments of enhanced protocol conversion system 70, to lower the number converter/controller device input/output terminals 15, 84. For example, one set of terminals 15,84 which supports a PCI local bus 28 can provide both electrical interface A 30 and electrical interface C 82.

In contrast, in a conventional protocol converter 14, as seen in FIG. 1, an embedded microprocessor 38 within a converter/controller device 14 executes instructions 33,37 between a first interface 30 and a second interface 34.

The offloading protocol support logic 80 and interface 82 communicates with the first protocol 32, and forwards first protocol information 33 to the CPU 18 and enhanced ROM and device drivers 76,78. The CPU 18 and enhanced ROM and device drivers 76,78 process the first protocol information 33, convert the first protocol information 33 to second protocol information 37 as necessary, and forward the second protocol information 37 to the second protocol 36 and second interface 34, through the intermediate protocol support logic 80 and interface 82.

Similarly, the offloading protocol support logic 80 and interface 82 communicates with the second protocol 36, and forwards second protocol information 37 to the CPU 18 and enhanced ROM and device drivers 76,78. The CPU 18 and enhanced ROM and device drivers 76,78 process the second protocol information 37, convert the second protocol information 37 to first protocol information 33 as necessary, and forward the first protocol information 33 to the first protocol 32 and first interface 30, through the intermediate protocol support logic 80 and interface 82.

Since the enhanced CPU 18 and ROM and device drivers 76,78 provide off-loaded protocol conversion between the first protocol 32 and the second protocol 36, the first and second protocols 32,36 can be standardized. Furthermore, since current microprocessors 18 often have significant processing power, the CPU 18 and enhanced ROM 76,78 can readily provide protocol control and conversion, eliminating the need and associated cost of a separate embedded microprocessor 38 (FIG. 1) within the enhanced converter/controller 74.

The supported end function 16 is typically associated with or soldered to the platform 12, through the second electrical interface 34. The supported end function 16 may be one of many functions desirable by the user of the computer system platform 70. For example, the end function 16 may typically comprise a disk drive or other storage interface, a network interface, an audio or video user interface, a human input device interface, a data acquisition interface, or an alternate bus interface, which acts as a bridge or router. The end function 16 may alternately comprise a wireless connectivity endpoint, e.g. such as a BlueTooth™ wireless transceiver. For end functions 16 which are embedded in the enhanced converter/controller 74, the protocol B 36 and electrical interface B 34 may not be visible or accessible outside the enhanced converter/controller 74.

Figure 4:
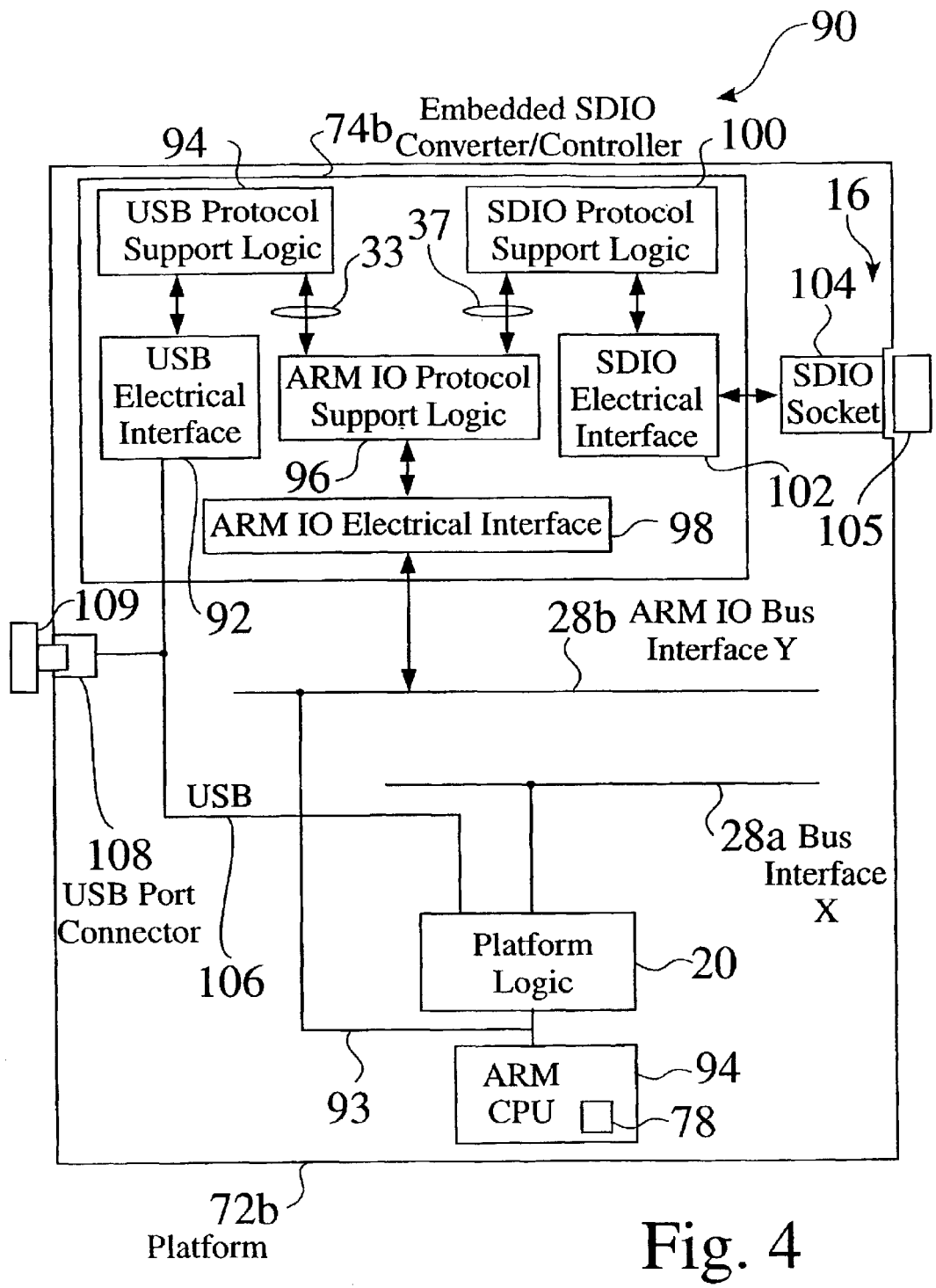
FIG. 4 is a schematic diagram of an enhanced USB-based system platform, comprising an SDIO controller and an off-loading protocol interface.

USB-Based SDIO Controller. FIG. 4 is a schematic diagram of an enhanced USB-based system platform 90, comprising an embedded SDIO converter/controller 74b, which provides efficient protocol control and conversion through a RISC processor 91, such as between a USB-based interface 92 and protocol 94, and a secure digital input/output (SDIO) end function 16, comprising an SDIO socket 104 and a connectable SDIO device 105.

The SDIO socket 104 is readily used for a variety of SDIO devices 105, such as a Blue Tooth™ card, a camera card, and/or a cell phone card. The platform 90 also preferably comprises a USB port connector 108 on the USB bus 106. In one embodiment of an enhanced ARM platform 90, the platform 90 provides USB connectivity 108 to a USB compatible personal computer 109, and SDIO connectivity to an SDIO device 105, through the SDIO socket 104.

In one embodiment of the enhanced USB-based system platform 90 shown in FIG. 4, the processor 91 is an ARM CPU 91, manufactured by ARM Ltd., of Cambridge, England. The CPU 91 is typically an embedded RISC microprocessor 91, and is readily used within a wide variety of small handheld devices, such as but not limited to personal digital assistants (PDAs), digital cameras, and/or phones, e.g. such as GSM phones.

The SDIO converter/controller 74b comprises an intermediate off-loading ARM I/O protocol 96 and interface 98, which offloads tasks from the controller converter 74b to the ARM central processor 91.

The USB electrical interface 92 and associated USB protocol support logic 94 comprise a USB-based first interface and protocol 30,32, which is connected to a USB bus 106. One or more USB port connectors 108 are connected to the USB bus 106, to readily provide connections for USB devices 109.

The SDIO electrical interface 102 and associated SDIO protocol support logic 100 comprise an SDIO-based second interface and protocol 34,36, in which an SDIO socket 104 connected to the SDIO electrical interface 102 provides a connection for an SDIO device 105.

The ARM IO interface 98 and ARM IO protocol support 98 communicates with the ARM CPU 91, through an ARM I/O bus interface 28b, and does not share the USB electrical interface 92, which is connected to platform logic 20 through a USB bus 106.

While the enhanced USB-based system platform 90 provides a USB attachment 106 to the ARM CPU 91, the offloaded control and conversion instructions are sent between the ARM IO interface 98 and the ARM processor 91, through the ARM IO bus interface 28b, to an ARM peripheral bus 93 which extends from the ARM CPU platform 91.

In some embodiments of the system platform 90, a plurality of device drivers 78 (FIG. 3) are initially loaded onto the ARM microprocessor 91, such that a wide variety of SDIO cards 105 are initially supported.

In alternate embodiments of the system platform 90, different or updated protocols, such as device specific SDIO protocols 100, are uploadable through the embedded SDIO converter/controller 74b, or alternately through the device drivers 78 within the CPU 91.

Figure 5:
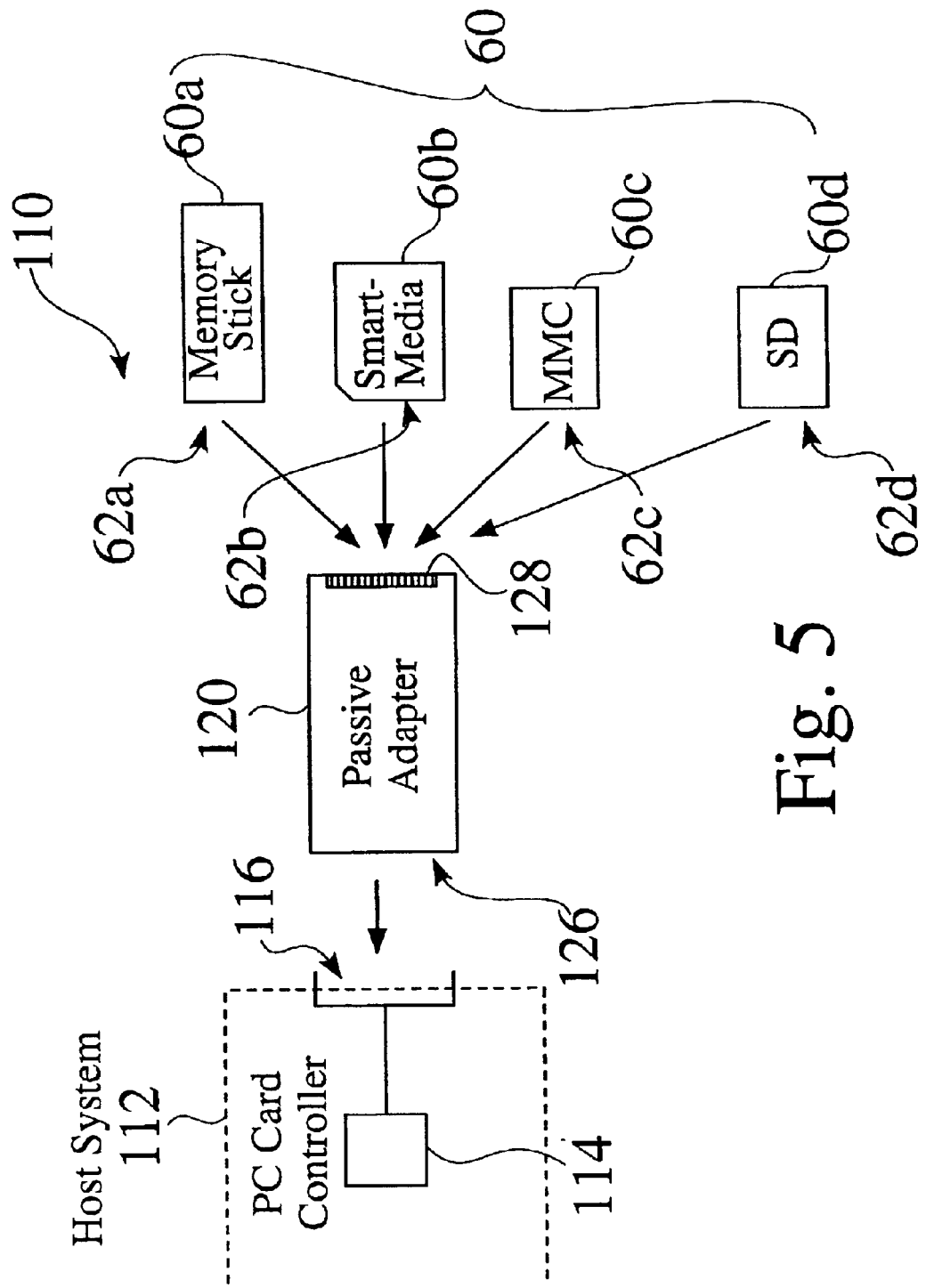
FIG. 5 shows a passive media adapter system having an enhanced PC card controller adapted to receive one or more flash media having different formats through a multi-media passive adapter.

Enhanced Protocol Conversion for Passive Flash Media Adapter System. FIG. 5 is a functional block diagram of a passive flash media adapter system 110. A host system 112 comprises an enhanced PC card controller 114, which is adapted to receive one or more flash media 60, such as 60a,60b,60c, and 60d, having different formats through a passive adapter 120, which supports one or more media formats.

The enhanced PC Card controller 114 supports multiple flash media types 60, e.g. 60a,60b,60c,60d within a single passive adapter 120, such that one or more of the flash media 60 can be electronically and physically connected to the host system 112 at the same time. The multimedia passive adapter 120 shown in FIG. 5 comprises a system connection end 126, having system contacts 216 (FIG. 13-FIG. 20), and one or more media sockets 128, to receive one or more flash media 60.

The multimedia passive adapter 120 interacts with the enhanced PC Card controller 114, to communicate card detection information as well as flash media type, such that the enhanced PC card controller 114 determines, i.e. senses, the presence of one or more installed flash media 60, and determines the type of connected flash media 60, e.g. such as a SmartMedia™ card 60b.

The enhanced PC Card controller process preferably comprises a sensing, i.e. query, step 178 (FIG. 9), to determine that a connected passive adapter 120 supports multiple media types. Once the enhanced PC Card controller 114 determines that multiple media types are supported in the passive adapter 120, the enhanced PC Card controller 114 abandons the query process 178, and performs a media determination process 200 (FIG. 10), to determine which type of media 60, e.g. 60a, is currently connected to the passive multi-media adapter 120, preferably based upon corresponding unique card detect or presence indicator signals.

In some embodiments of the passive multimedia adapter system 110, the enhanced PC Card controller 114 supports access between the host system 112 and one media card 60, e.g. such as a media card 60*a*, even when more than one media card 60 is present within an adapter 120 which can receive more than one media card 60. For example, when a Memory Stick™ card 60*a* is inserted in a passive adapter 120 at the same time as a SmartMedia card 60*b*, the enhanced PC Card controller 120 typically utilizes a priority scheme to connect just one of the media cards 60, e.g. 60*a*, to the host system 112.

In alternate embodiments of the passive multimedia adapter system 110, the enhanced PC Card controller 114 supports a connection between the host system 112 and more than one media card 60*a*,60*b*,60*c*,60*d* at the same time. For example, when a Memory Stick™ card 60*a* is inserted in a passive adapter 120 which can receive more than one media card 60 at the same time as a SmartMedia card 60*b*, the enhanced PC Card controller 114 may preferably connect both the Memory Stick™ card 60*a* and SmartMedia™ card 60*b* to the host system 112 at the same time.

The passive multimedia adapter systems 110 are exemplary preferred embodiments of the enhanced protocol conversion system 70. In the passive multimedia adapter system 110, in reference to FIG. 3, the first electrical interface 30 is typically a PCI Bus, the first protocol 32 is ATA, the second electrical interface 34 is media-dependent (e.g. such as SD, SmartMedia, Memory Stick™), the intermediate electrical interface 82 is PCI, and the offloading protocol C 80 is typically MediaBay Accelerator Protocol.

The MediaBay Accelerator system 110 preserves the ATA protocol 32, such that the MediaBay Accelerator register interface protocol 82 is completely isolated from the ATA protocol 32 that is used to communicate with the PC Card Media Reader.

Figure 6:
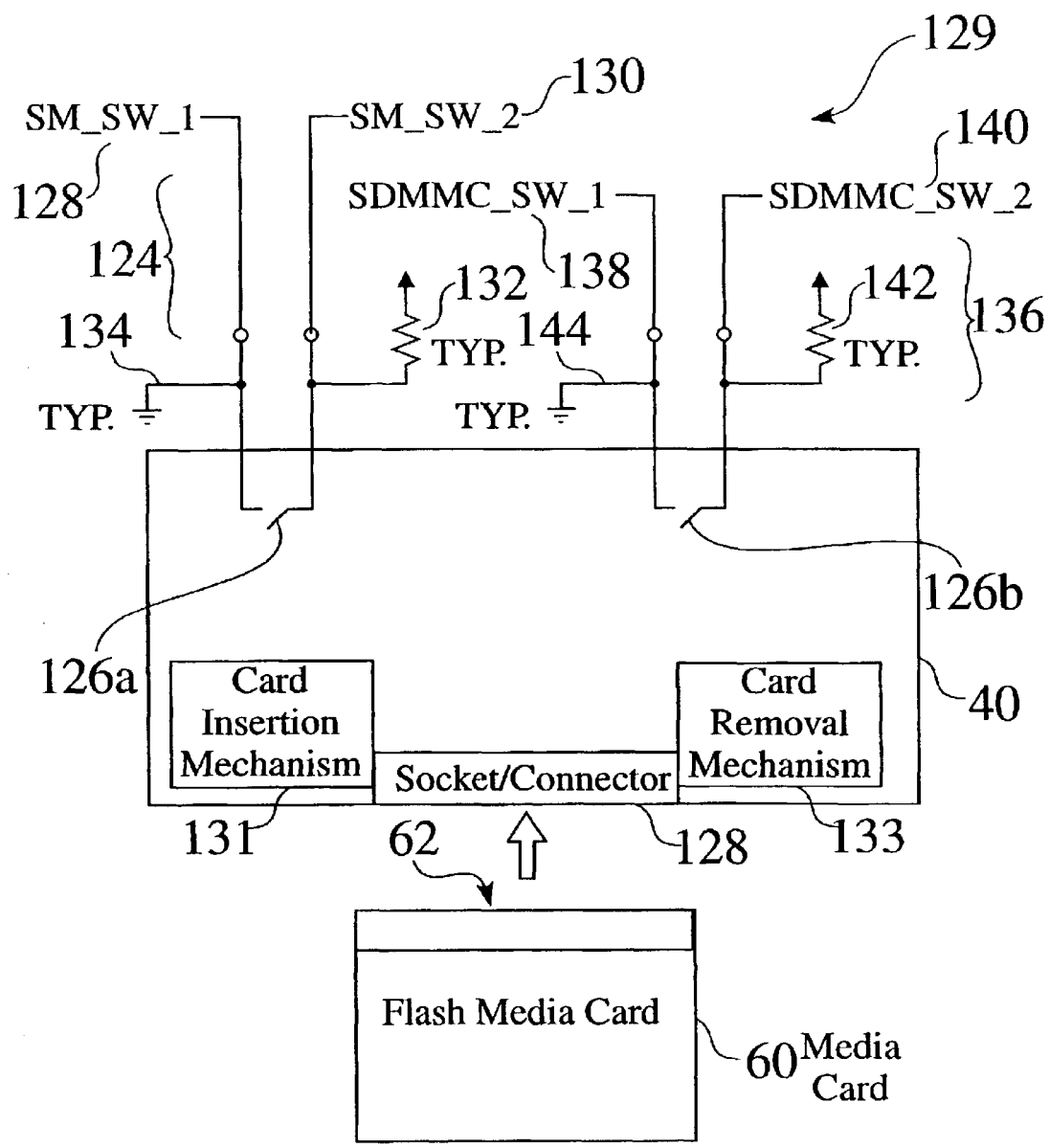
FIG. 6 is a schematic diagram of media card insertion and detection within a multi-media adapter.

FIG. 6 is a schematic diagram 129 of media card insertion and card detection for a multi-media adapter 120, such as a multimedia 2-in-1 or 3-in-1 multimedia socket adapter 120. In one embodiment of the system 110, the passive multimedia adapter 120 is Part No. FRS001-2000-0 2-in-1 socket, manufactured by Yamaichi Electronics Co., Ltd., of Tokyo, Japan, which supports either a SmartMedia™ card 60*b* or an SD card 60*d*. The adapter 120 preferably comprises a card insertion mechanism 131, e.g. such as manual or assisted insertion 131, as well as a card removal mechanism, such as a manual or ejector-type removal mechanism 133.

In the embodiment shown in FIG. 6, SM_SW_2, pin 130, comprises logic level high when no SmartMedia™ card 60*b* is inserted within socket 128, and comprises logic level low when a SmartMedia™ card 60*b*, having electrical interface 62*b*, is inserted within socket 128. Similarly, SDMMC_SW_2 pin 140 is logic level high when no Multimedia card (MMC) card 60*c* or SD Card 60*d* is inserted, and is logic level low when either a MultiMedia card 60*c* or an SD Card 60*c* is inserted. While MultiMedia cards (MMC) 60*c* and SD media cards 60*d* are different card types, MultiMedia cards (MMC) 60*c* and SD media cards 60*d* share a common electrical interface 62*c*.

Figure 7:
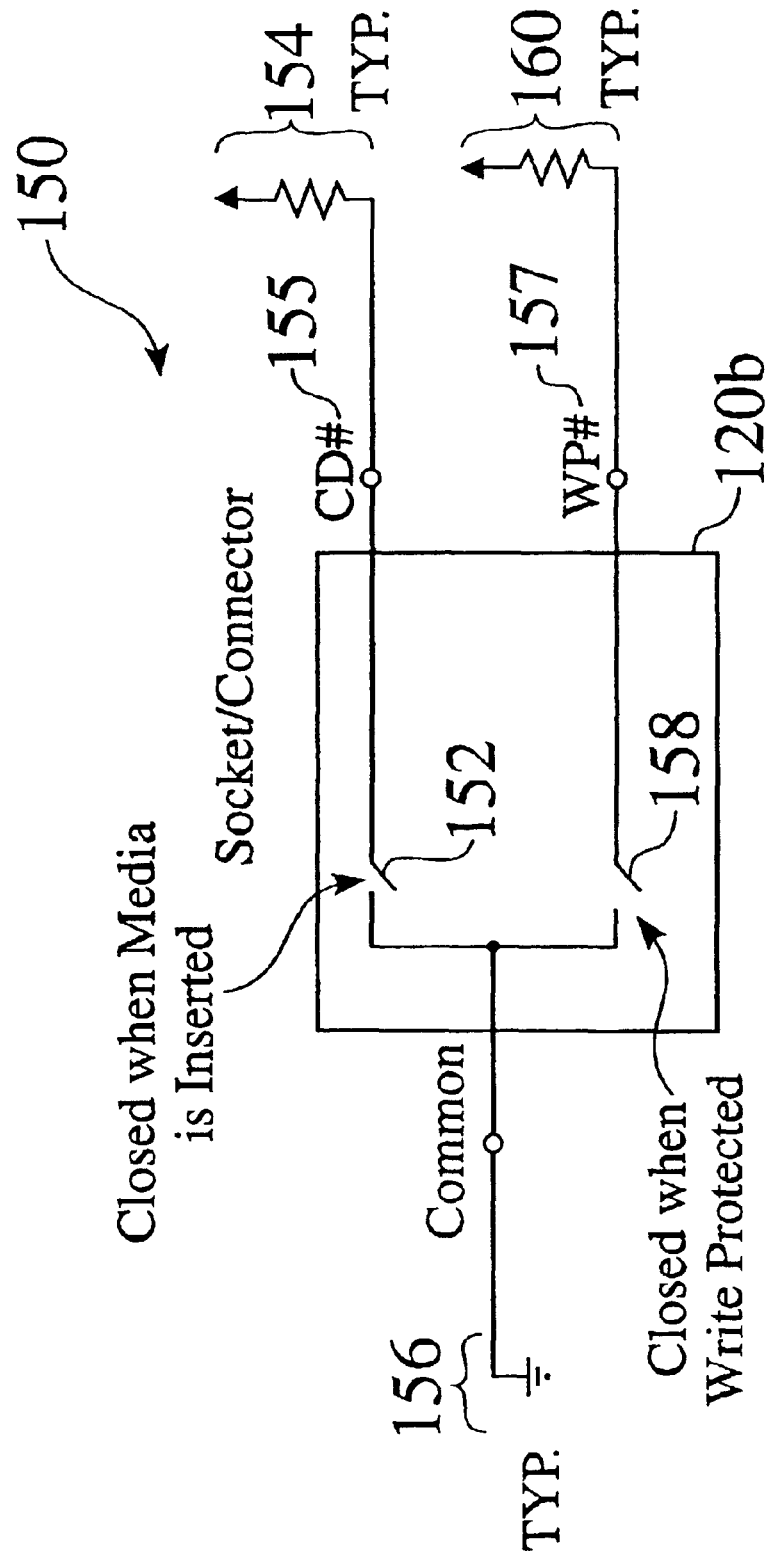
FIG. 7 is a schematic diagram of card detection and write protection for flash media.

FIG. 7 is a schematic diagram 150 of card detection circuitry 155 and write protection circuitry 157 for a single media socket adapter 120 that utilizes a common logic level to indicate card insertions and write protection, such as a Part No. FPS009-3000, available through Yamaichi Electronics Co., Ltd., of Tokyo, Japan. In FIG. 7, card detect CD 155, typically acting through a switch 152 and circuitry 154 to a ground 156, is logic level high when no card 60 is inserted, and is logic level low when a card 60 is inserted. Similarly, write protect 157, typically acting through a switch 158, circuitry 160 to ground 156, is logic level high when no write protection is activated on the connected media 60, and is logic level low when the flash media 60 is write protected. As seen in FIG. 7, the card detection circuitry 155 is functionally equivalent to the card detection circuitry 129 shown in FIG. 6.

Figure 8:
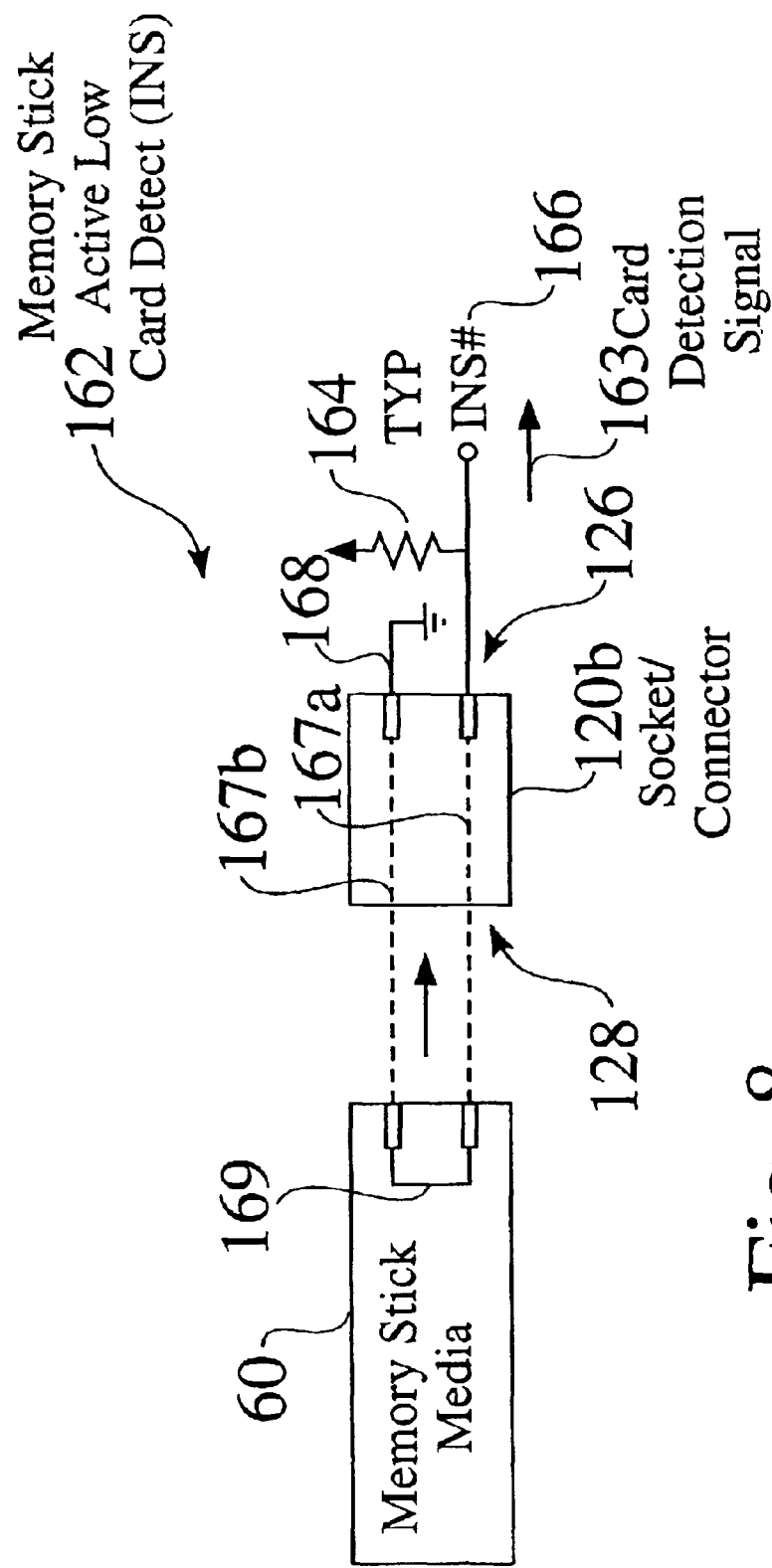
FIG. 8 is a schematic diagram of card detection for Memory Stick media.

FIG. 8 is a schematic diagram 162 of card detection for Memory Stick™ media 60*a*. In the passive multimedia socket adapter 120*b* shown in FIG. 8, a mechanical switch, such as card detect switch 152 (FIG. 7) is not required. When Memory Stick™ flash media 60*a* is inserted into the passive multimedia adapter 120*b*, the INS signal 166, typically connected to a potential through circuitry 164, is directly connected to the GND signal 168, typically through adapter paths 167*a*,167*b* and flash media connection 169, providing an active low card detection signal 163, via INS 166, in a manner similar to the card detection shown in FIG. 6 and FIG. 7. In one embodiment of the passive multimedia adapter 120*b* shown in FIG. 8, the passive multimedia adapter 120*b* is a Part No. 68156, available through Molex, Inc., of Lisle, Ill. In an alternate embodiment of the passive multimedia adapter 120*b* shown in FIG. 8, the passive multimedia adapter 120*b* is a DUO™ connector, available through Yamaichi Electronics Co., Ltd.

Figure 9:
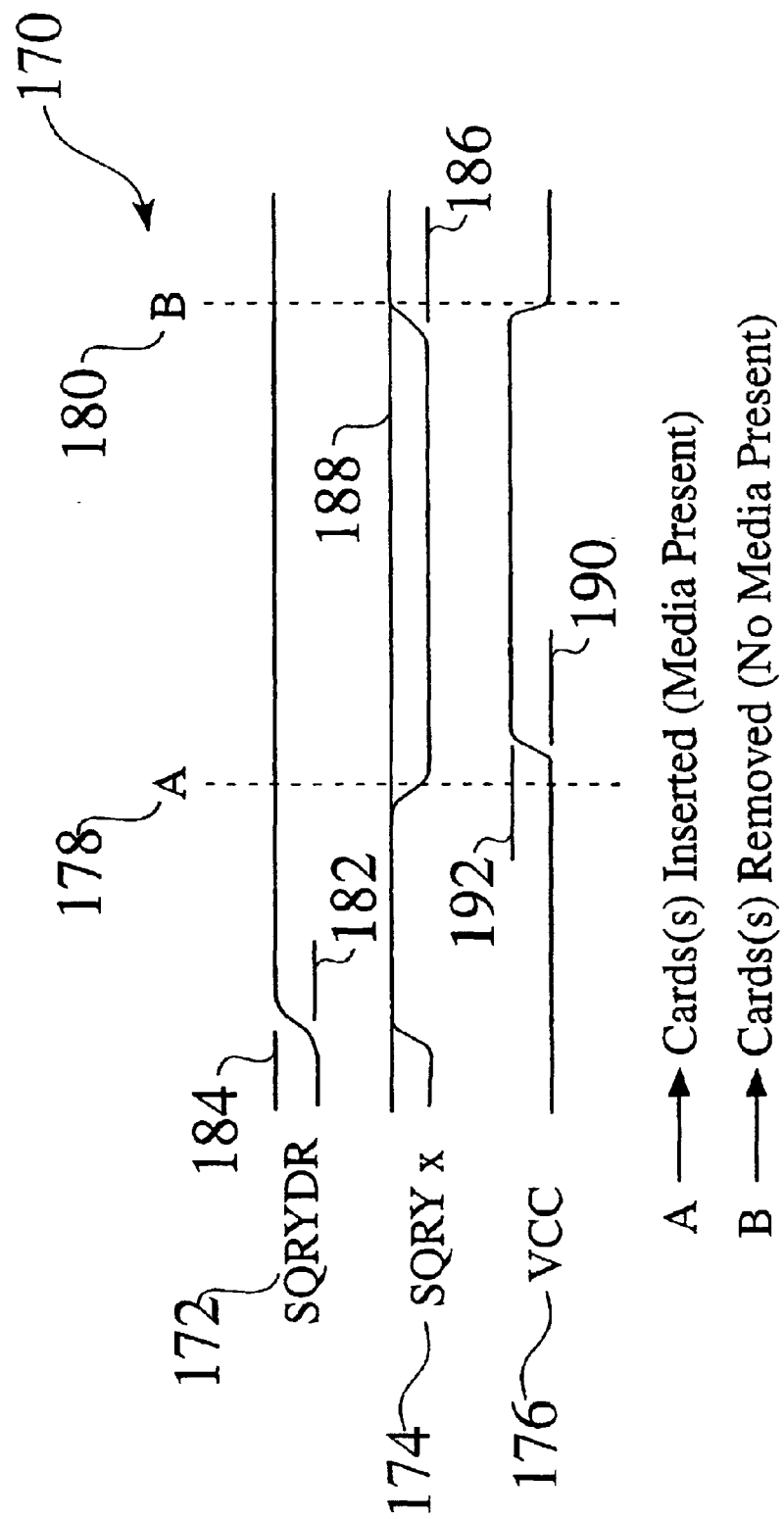
FIG. 9 is a query diagram for a passive flash media adapter system.

FIG. 9 is a query diagram 170 for a passive flash media adapter system 110. A SQRYDR query signal 172 is controlled between a first state 182 and a second query state 184. SQRY x signals are sampled between a first state 186 and a second state 188. A media supply voltage VCC has a first state 190 and a second state 192. As seen in FIG. 9, the enhanced PC card controller 114 continuously asserts SQRYDR 172, and samples SQRYx 174, to determine insertion events of one or more media 60. During the query process 170, the MC_CD# signal is typically ignored. Once the adapter-sensing step 178 is complete, i.e. when the enhanced PC card controller 114 determines that a flash media 60 is present, at Point A, the enhanced PC card controller 114 determines whether the connected passive adapter 120 supports multiple media types 60, e.g. such as 60*a*,60*b*,60*c*,60*d*. Similarly, as seen in FIG. 9, enhanced PC card controller 114 can determine when connected media 60 are removed 180, at Point B, based upon the query states.

Figure 10:
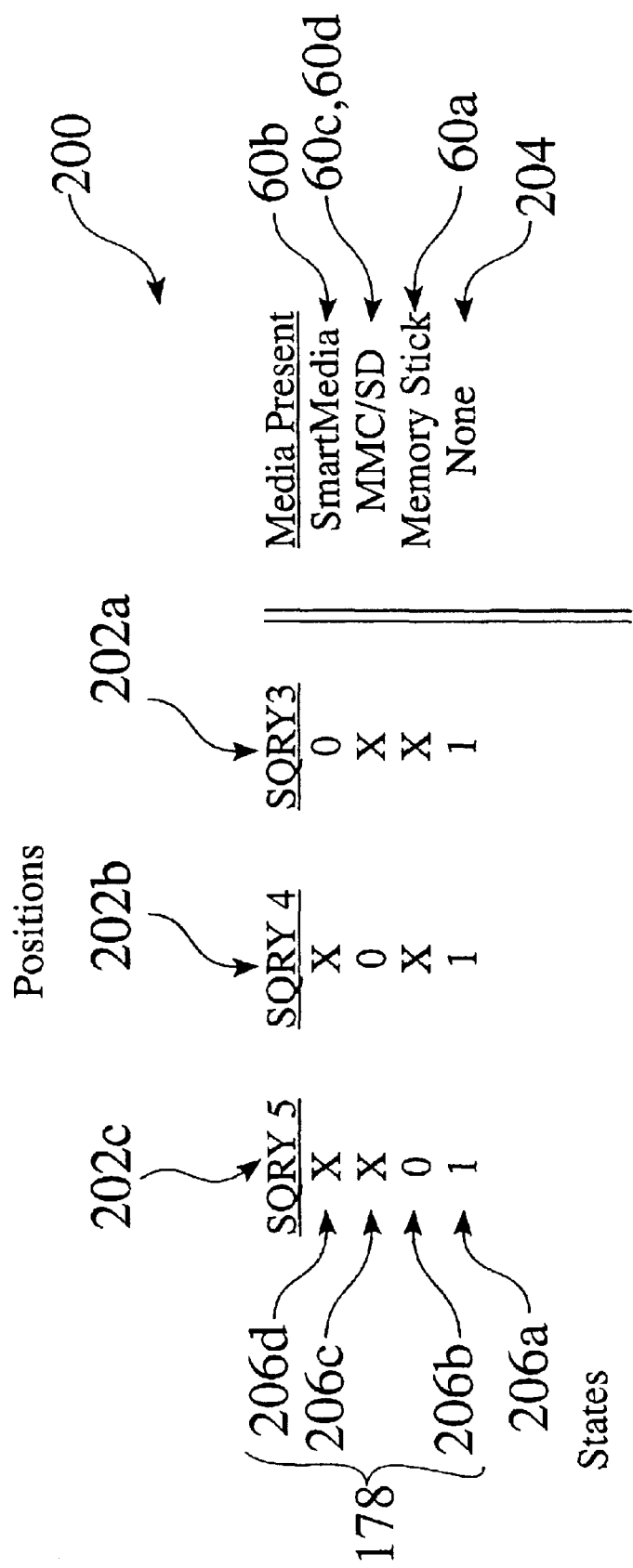
FIG. 10 is a query logic table for a passive flash media adapter system.

FIG. 10 is a query logic table 200 for card sensing within a passive flash media adapter system 110. Active low card detect signals for SmartMedia 60*b*, MMC/SD media 60*c*, 60*d*, and Memory Stick™ media 60*a* are respectively wired to SQRY3 202*a*, SQRY4 202*b*, and SQRY5 202*c*. The enhanced PC Card controller 114 samples SQRY5:3, to determine media card insertions into the passive adapter 120. As seen in FIG. 10, a logic state 206*d* indicates corresponding active low card detect signals for SmartMedia™ 60*b*. Logic state 206*c* indicates corresponding active low card detect signals for either an MMC card 60*c* or an SD card 60*d*. Logic state 206*b* indicates corresponding active low card detect signals for a Memory Stick™ 60*a*. Logic state 206*a* corresponds to query positions 202*a*,202*b*,202*c* which indicate that no media 60 is present 124.

Figure 11:
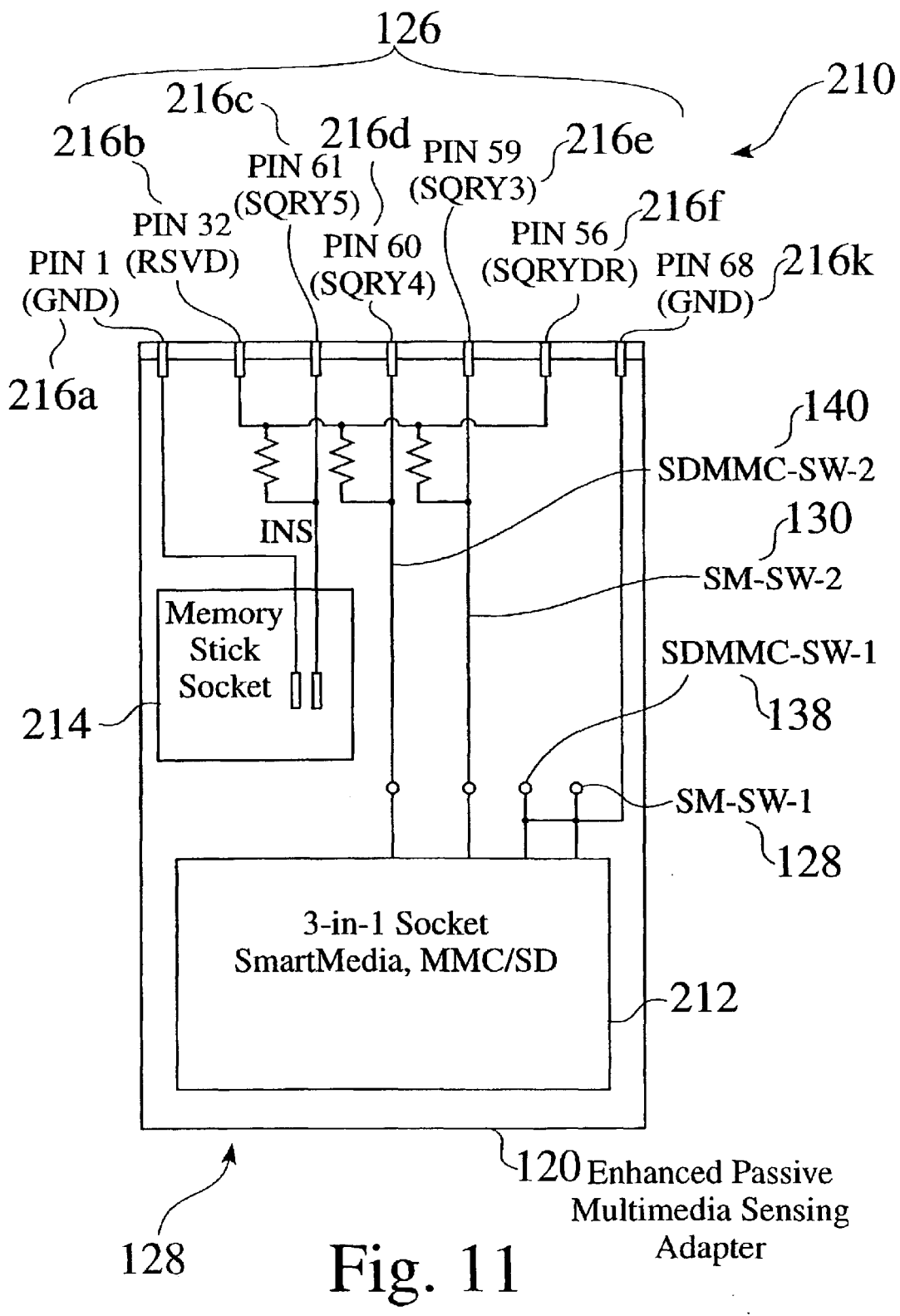
FIG. 11 is a schematic diagram of a passive adapter for sensing flash media having different formats.

FIG. 11 is a schematic diagram 210 of a passive adapter 120 for sensing flash media having different formats 60, which provides multimedia sensing between the enhanced PC card controller 114 and flash media 60. The passive multimedia adapter 120 comprises a plurality of system interface, i.e. card bay, pins 216*a*–216*k* within a system connection region 126. In the exemplary embodiment shown in FIG. 11, Pin 1 216*a* is a ground GND, Pin 2 is RSVD pin 216b, pin No. 61 is SQRY5 216c, Pin No. 60 is SQRY pin 216d, Pin No. 59 is SQRY3 216e, Pin No. 56 is SQRYDR 216f, and Pin No. 68 is a ground GND 216k. The passive adapter 120 also comprises a Memory Stick™ socket 214, for connection to Memory Stick™ media 60a, and a 3-in-1 socket 212, to connect to any of SmartMedia 60b, MMC media 60c, and/or SD media 60d.

The multi-media sensing process comprises the steps of adapter-sensing 178 and card-sensing 200. The passive adapter 120 shown in FIG. 11 preferably comprises 3-in-1 socket 212, which can be used as an interface between the enhanced PC card controller 114 and a variety of flash media 60 having different formats, such as an SD card 60d, a MultiMedia card 60c, or a SmartMedia card 60b.

Adapter-Sensing Process. The enhanced PC Card controller 114 identifies the presence of a card bay card, such as a passive multimedia adapter 120 or other types of card bay cards, within a card bay port 116. The enhanced PC Card controller 114 preferably identifies the presence of a card bay card, based upon corresponding unique card detect or presence indicator signals. The enhanced PC card controller 114 determines whether the inserted card bay card is a passive multimedia adapter 120. In one embodiment of the enhanced PC Card controller 114, the enhanced PC card controller 114 asserts Pin (A25//CAD19//SQRYDR) 216f, e.g. such as at Pin No. 56 shown in FIG. 11, and samples the input to the PC card interface pin 112 (D2//RFU//RSVD) 216b. If the PC card interface pin 216b sample returns a logic high value (One), the PC card controller 114 determines that the card bay card is a passive adapter 120 adapted to support multiple media types 60 within a single adapter 120. If the PC card interface pin 216b sample returns a logic low signal (Zero), the enhanced PC card controller 114 determines that the card bay card is not a passive adapter 120, and is not adapted to support multiple media types 60 within the passive multimedia adapter system 110.

In some system embodiments, the passive adapter 120 is preferably designed to connect the SQRYDR signal 216f, i.e. Pin 56, directly to Pin 32 (D2//RFU//RSVD) if it is consistent with this invention, as shown in FIG. 11. All other CardBay cards typically implement Pin 32 as a ground signal, such as through ground pin 216a or ground pin 216k, i.e. logic level low.

The adapter-sensing process 178 generally provides a sensing mechanism such that the enhanced PC Card controller 114 is notified that a passive adapter 120 that supports multiple media types 60 is inserted into the socket 124,212, 214. The adapter-sensing process 178 may alternately be performed in ways other than the preferred embodiment described above. For example, a different PC Card interface pin 136 may be sampled to sense the presence of a media card 60c.

As seen in one embodiment of the card-sensing process 178 shown in FIG. 9, the SQRYDR signal 172 is activated 184, and is used as the high logic level source for card detection circuitry on the passive adapter 120. Once the enhanced PC Card controller 114 determines through adapter-sensing 178 that a passive multimedia adapter 120 has been inserted that is consistent with the passive multimedia adapter system 110, the enhanced PC card controller 114 abandons the query process 178 and performs a card-sensing scheme 200, to determine the type of one or media 60 which are connected to the passive adapter 120.

The card sensing process 200 shown in FIG. 10 utilizes an active low card detect signals from SmartMedia sockets, MMC/SD sockets, and Memory Stick sockets that are interfaced with the enhanced PC Card controller 114, via SQRY3, SQRY4, and SQRY5 (Pin 59, Pin 60, Pin 61) respectively. The SQRY5:3 query indicates the presence of media 60. The enhanced PC Card controller 114 continually samples the SQRY5:3 signals after the adapter-sensing process 178 is completed, to determine the presence of flash media 60, ignoring the MC_CD# signal.

Since more than one media type can be implemented by sampling SQRY5:3, the PC Card controller 114 can be further enhanced to activate multiple electrical interfaces to connect multiple media cards 60 to the host system 112 at the same time.

Figure 12:
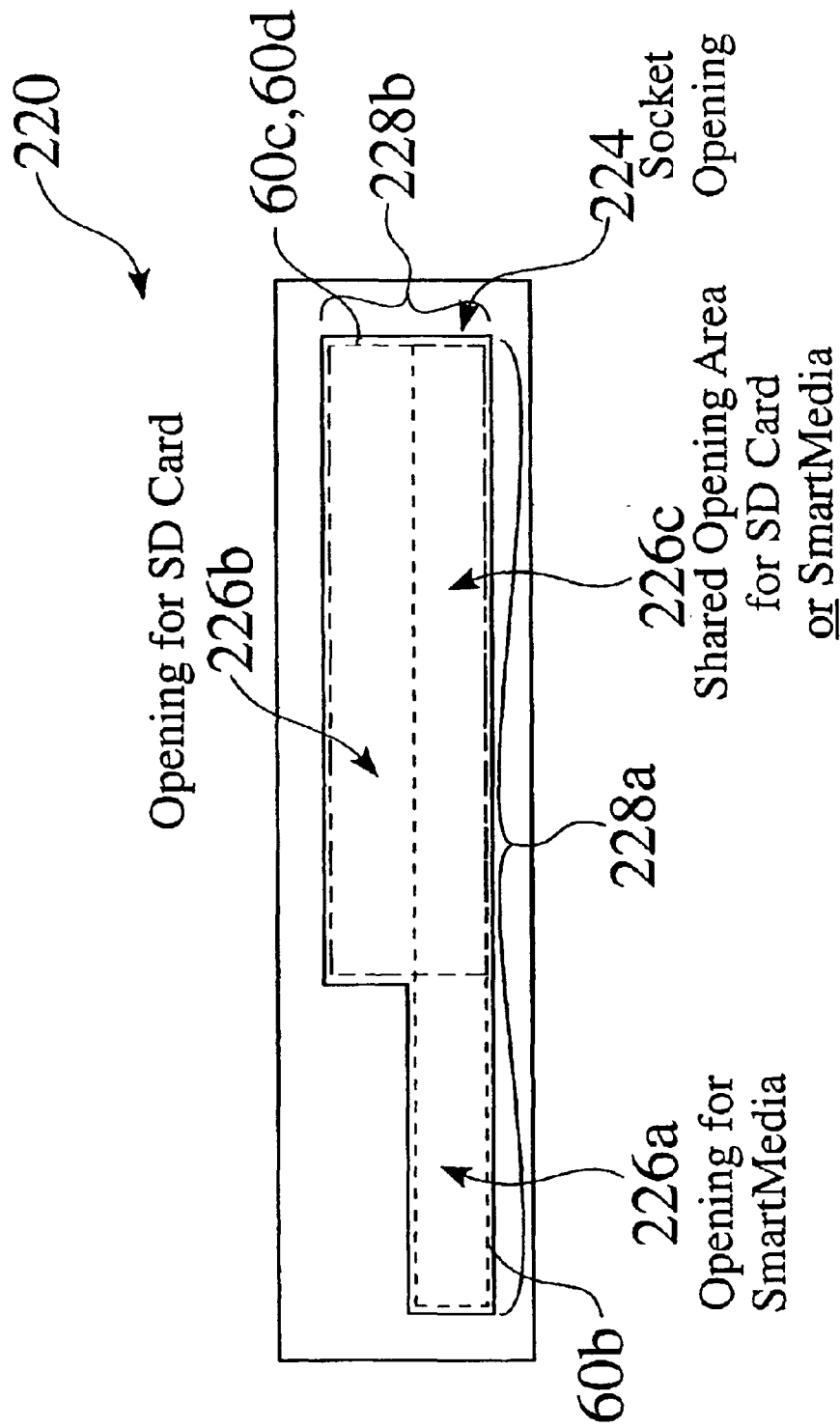
FIG. 12 is a front plan view of a passive adapter for sensing flash media having different formats, comprising a staggered back wall-stop.
Figure 13:
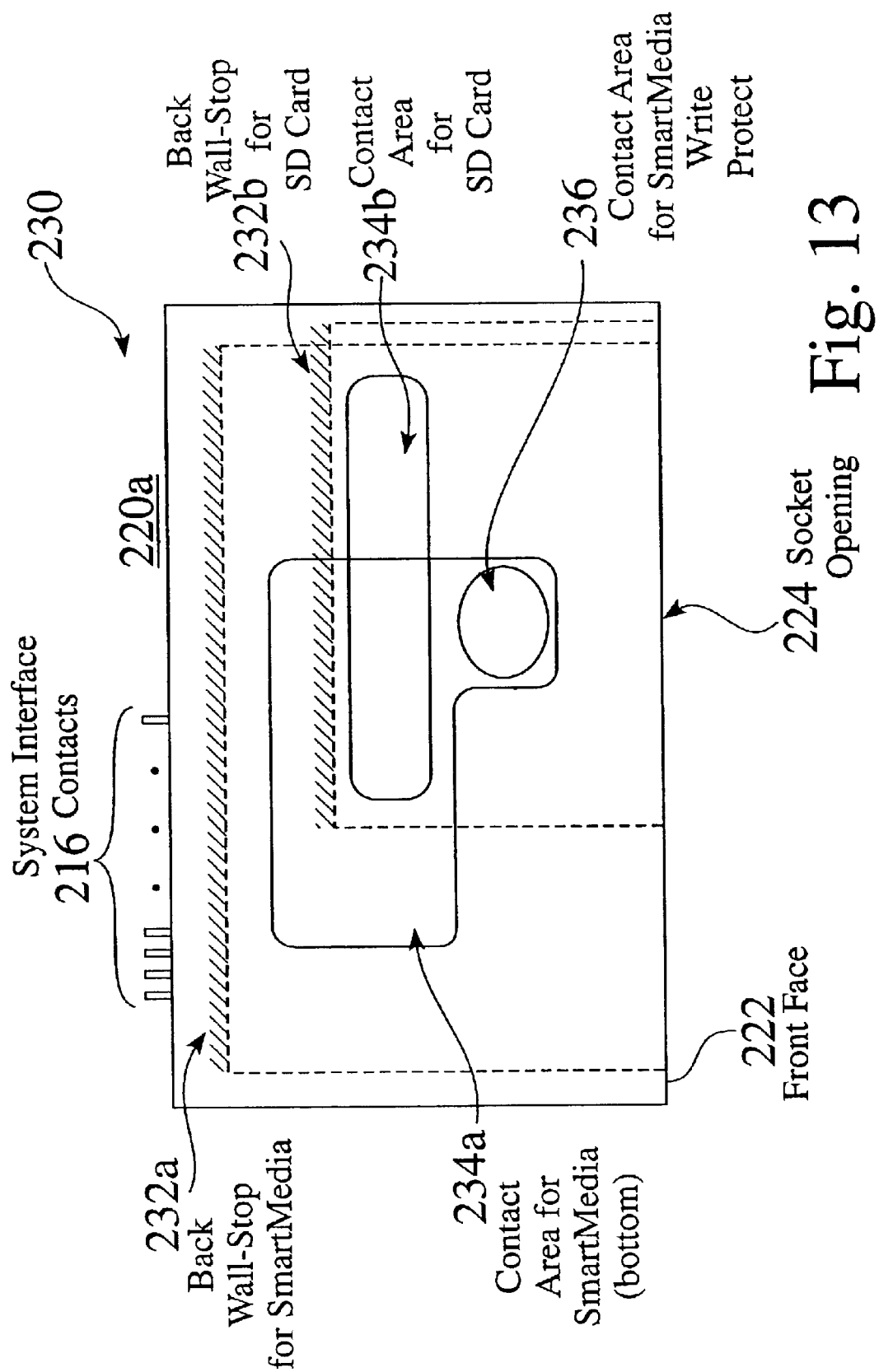
FIG. 13 is a top schematic view of a passive adapter for sensing flash media having different formats, comprising a staggered back wall-stop.

Passive MultiMedia Adapters. FIG. 12 is a front plan view of a passive adapter 220 for sensing flash media 60 having different formats 60b,60d, comprising a staggered back wall-stop 232a,232b (FIG. 13). A common card socket 224 located on the front face 222 (FIG. 13) comprises a plurality of socket regions 226a,226b,226c, wherein a SmartMedia card 60b may be connected to the passive adapter 220, within regions 226a and 226b, since the combined width 228a of the socket opening 224 within regions 226a and 226c provides access for a SmartMedia card 60b. An SD card may alternately be connected to the passive adapter 220, within regions 226b and 226c, since the combined height 228b of the socket opening 224 within regions 226b and 226c provides access for an SD card 60d.

The passive adapter 220 is considered to be a 2-in-1 connector, since the adapter 220 allows any one of two flash media types 60b,60d to properly interface to the system 12,112 at any time through the single adapter 220. In one embodiment, the passive adapter 220 is a Series FRS001 adapter, available through Yamaichi Electronics Co., Ltd. Alternate embodiments of the passive connector 220 comprise a variety of insertion and removal mechanisms. For example, a Yamaichi FRS001-2000-0 connector 220 comprises a push/push type insertion and removal system, a Yamaichi FRS001-2100-0 connector features manual card insertion and removal, and a Yamaichi FRS001-2200-0 connector 220 features ejector-type card removal. While a Yamaichi FPS009-3003 connector features manual card insertion and removal the FPS009-3003 connector does not provide an opening for a SmartMedia card 60b.

Figure 14:
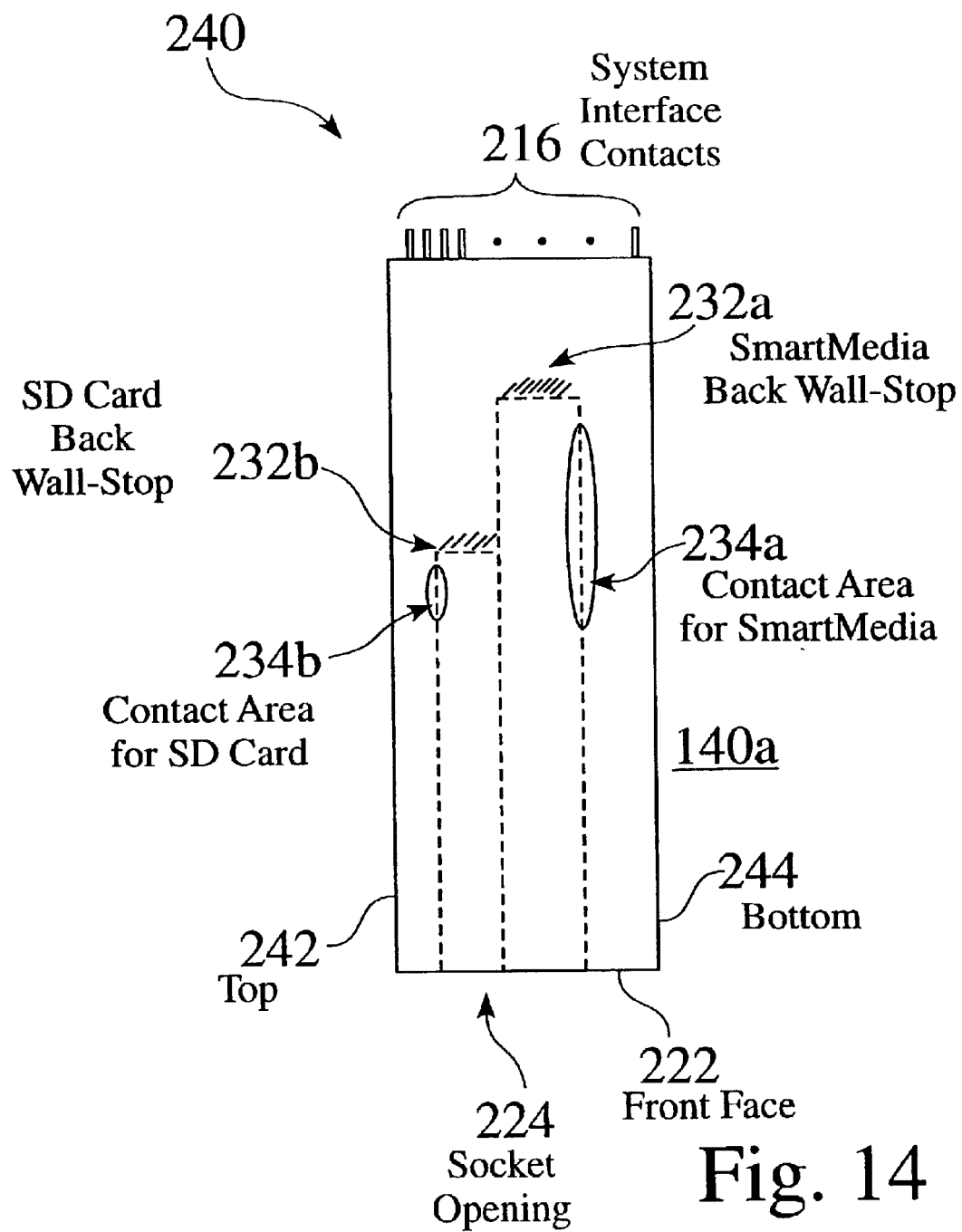
FIG. 14 is a side schematic view of a passive adapter for sensing flash media having different formats, comprising a staggered back wall-stop.

FIG. 13 is a top schematic view 230 of a passive adapter 220 for sensing flash media 60 having different formats 60b,60d, comprising a staggered back wall-stop 232a,232b. FIG. 14 is a side schematic view 240 of a passive adapter 220 for sensing flash media having different formats 60, comprising a staggered back wall-stop 232a,232b. The passive adapter 220 comprises a first contact area 234a, near the bottom 1244 of the adapter 220, for connection to a SmartMedia™ card 60b, and a second contact area 234b, near the top 242 of the adapter, for connection to an SD card 60d. The passive adapter 220 also comprises system interface contacts 216, to provide a connection between flash media 60b or 60b to a hot system 12,112, through contact areas 232a or 232b.

In some embodiments of the passive adapter 220, the common card socket 224 provides an opening sufficient for any of a SmartMedia card 60b, an MMC card 60c, or an SD card 60d to be inserted into the card socket opening 224. The wall-stops are positioned in this connector 220 such that a fully, properly inserted SD Card 60d or SmartMedia card 60b will similarly extend out from the front face by 6.2 mm.

Figure 15:
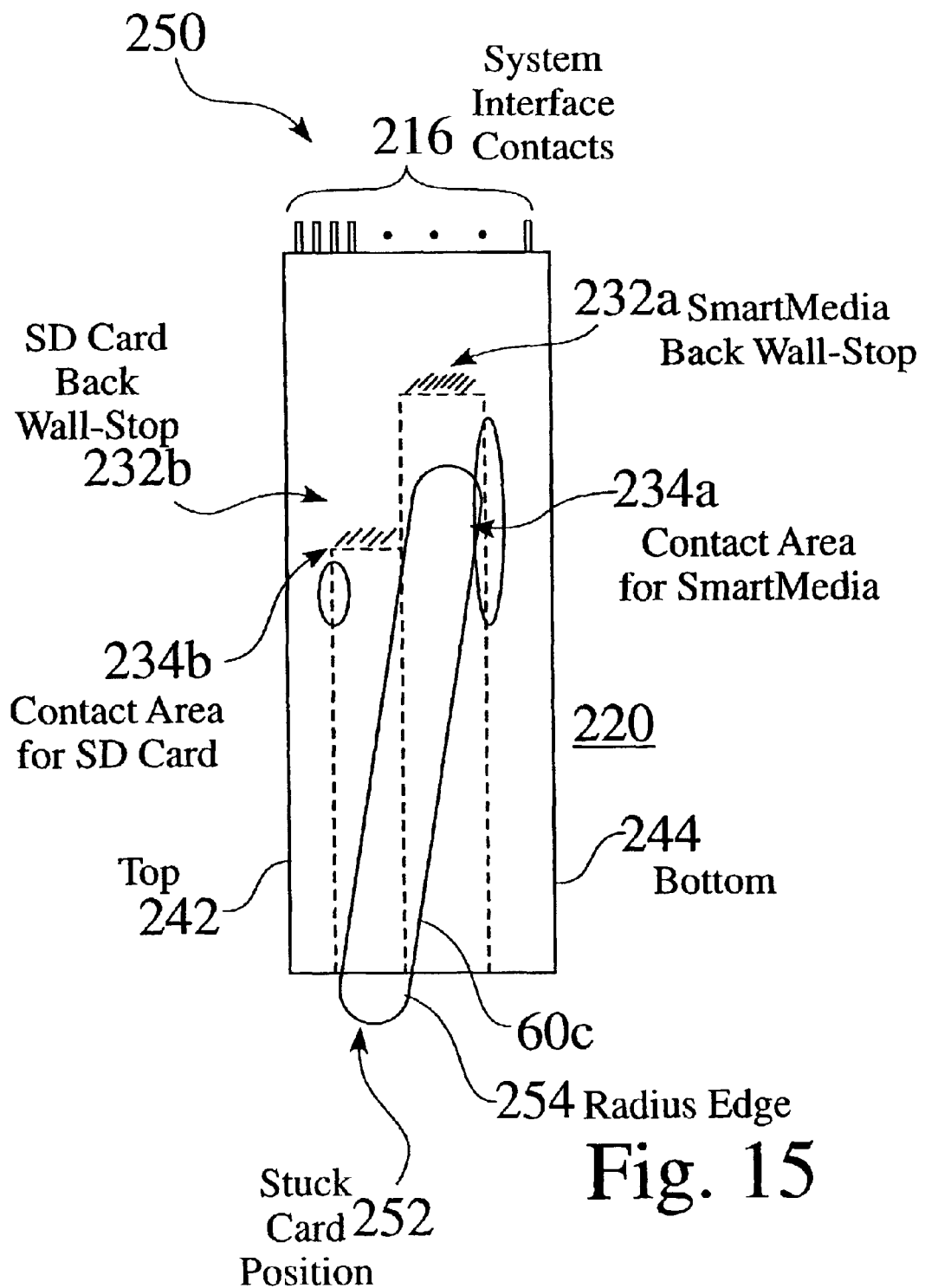
FIG. 15 is a side schematic view an incorrectly positioned MMC card within a passive adapter for sensing flash media having different formats, comprising a staggered back wall-stop.

FIG. 15 is a side schematic view 250 of an incorrectly positioned 252 MMC card 60c within a passive adapter 220 for sensing flash media 60 having different formats 60b,60d, comprising a staggered back wall-stop 232a,232b. MMC cards 60c are nominally thicker than the SmartMedia™ opening 226a,226c for a passive adapter 220. As well, MMC cards 60c are typically manufactured with a curved edge 254, whereby an MMC card 60c can problematically be stuck 252 in the passive adapter 220, such as when an MMC card 60c is firmly inserted. A firm MMC insertion may also cause a widening of the SmartMedia opening near the back SD card wall-stop 232b, further enabling a stuck position 252 of an incorrectly inserted MMC card 60c.

Since MMC cards 60c can be incorrectly inserted 252 within such passive adapters 220, as seen in FIG. 15, the use of an MMC card 60c is not supported, and passive adapters 220 are marketed and sold as a 2-in-1 connector 220, to connect to only a SmartMedia card 60b or to an SD card 60d. However, since the form factor, i.e. the size and contact regions of an MMC card 60c appear to interface to the combined socket 224, existing adapters 220 typically include labeling and/or documentation to prevent users from placing MMC cards 60c into the socket 224. As warning labels do not always prevent users from plugging MMC cards into the 2-in-1 socket 224, the stuck position 252 of an installed MMC card 60c often results in end-user frustration, troubleshooting time, as well as customer support costs to the system provider.

Figure 16:
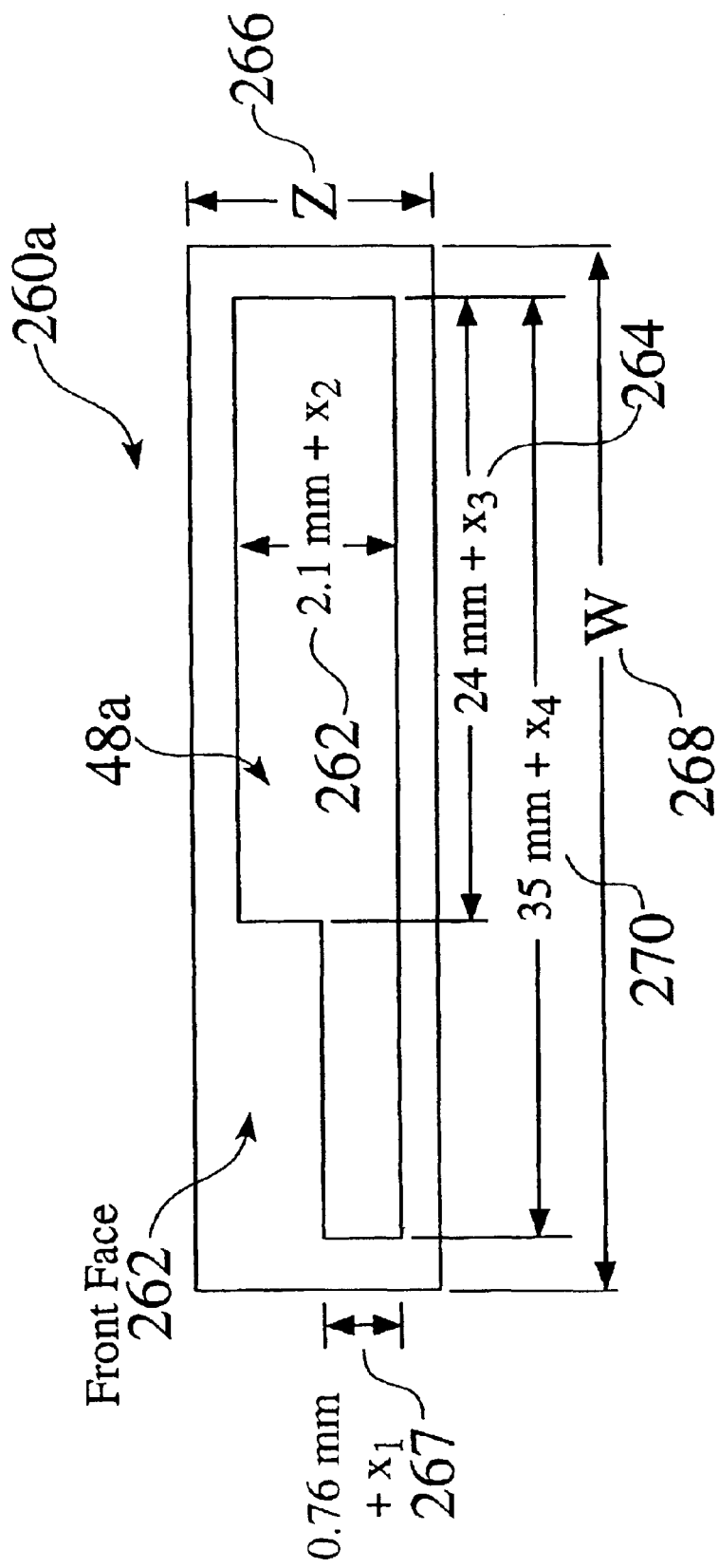
FIG. 16 is a front plan view of a passive adapter for sensing flash media having different formats.
Figure 17:
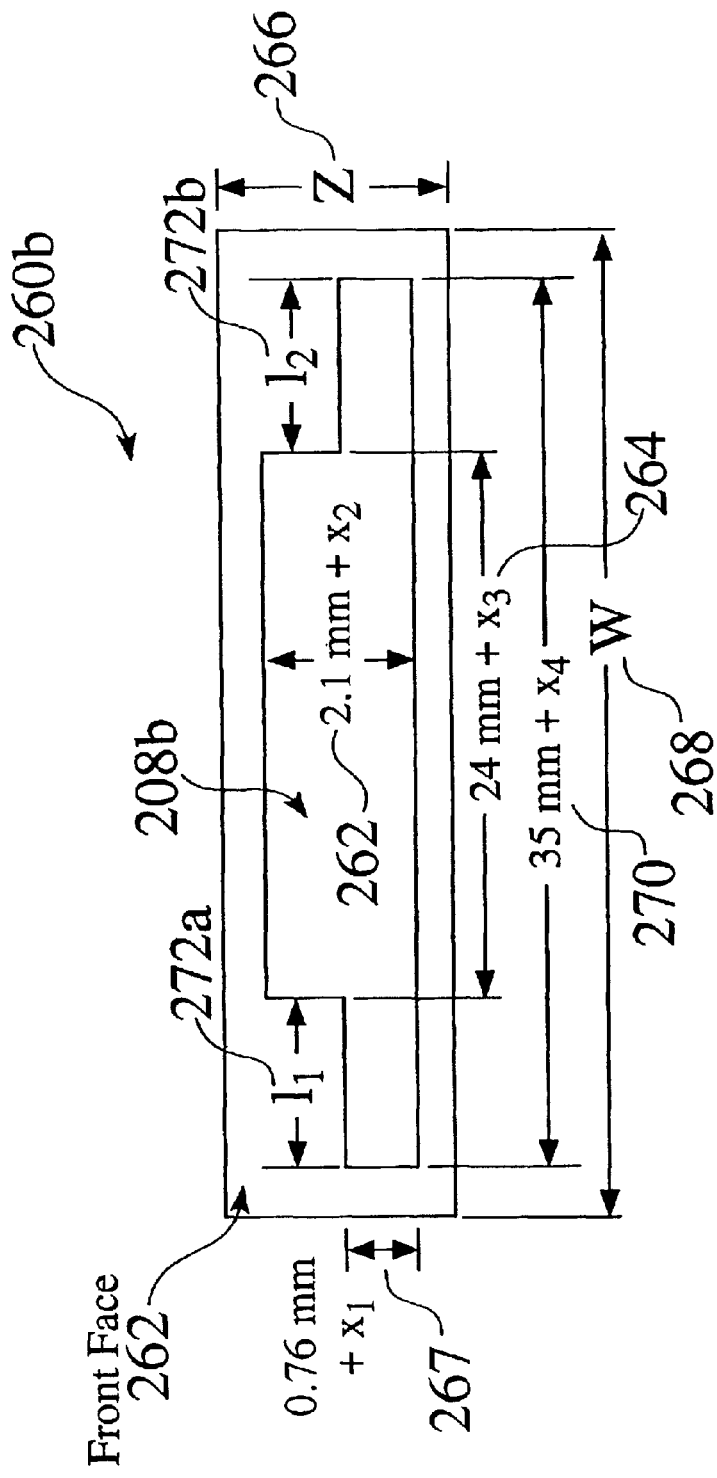
FIG. 17 is a front plan view of an alternate passive adapter for sensing flash media having different formats.
Figure 18:
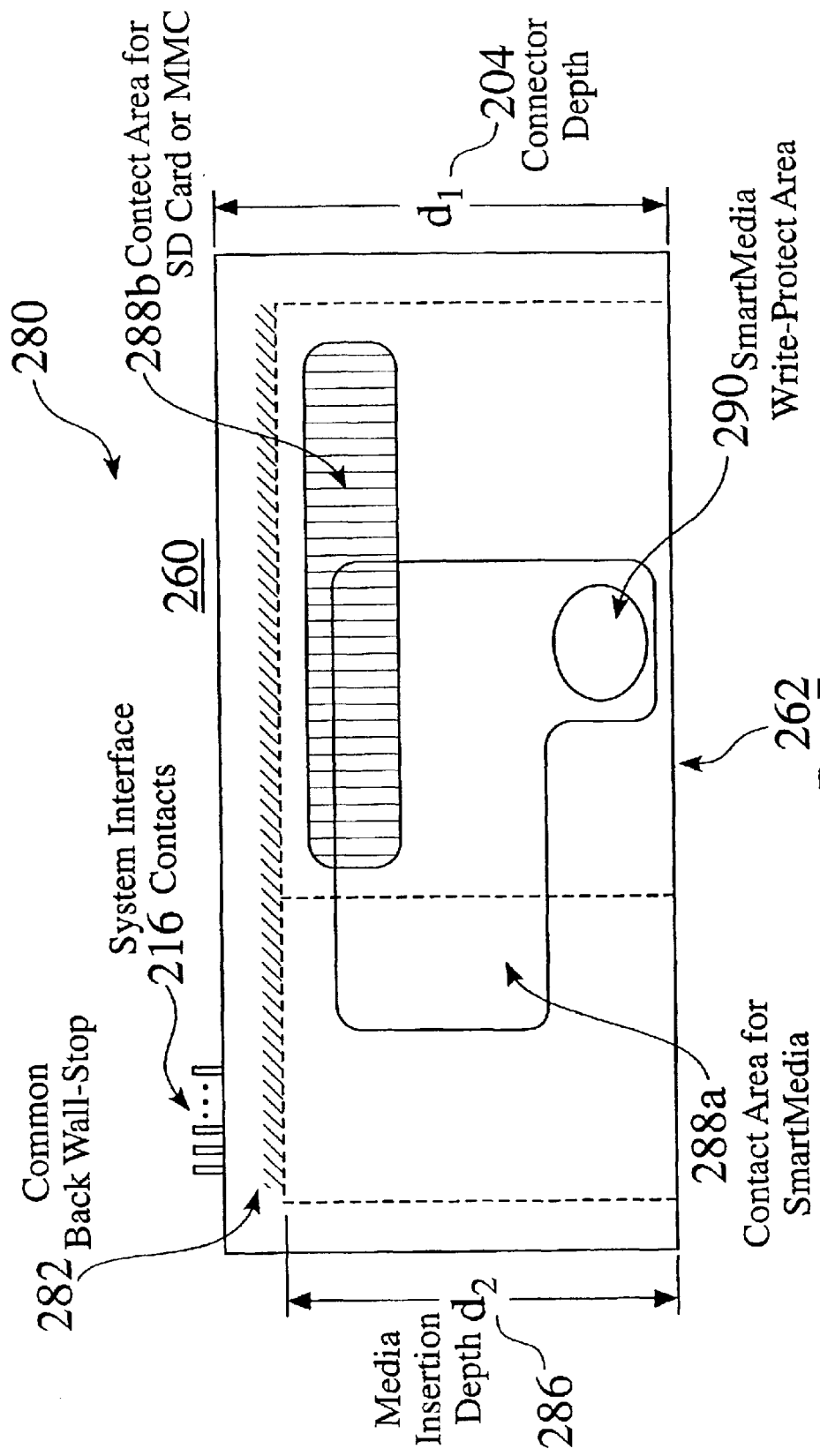
FIG. 18 is a top schematic view of a passive adapter for sensing flash media having different formats, comprising a common back wall-stop.

Improved Passive Adapter. FIG. 16 is a front plan view of a multiple format flash media adapter 260a for sensing flash media having different formats 60b,60c,60d. FIG. 17 is a front plan view of an alternate multiple format flash media adapter 260b for sensing flash media having different formats 60b,60c,60d. The front face 262 shown in FIG. 16 and FIG. 17 has a height Z 266 and a width W 268. A socket 128 is defined into the multiple format flash media adapter 260a, extending inward from the front face 262, to a media insertion depth 366 (FIG. 18). In cross-section, the socket 128a shown in FIG. 16 comprises an overall socket height 262, typically corresponding to an insertion height of either an MMC card 60c or an SD card 60d, and overall socket width 270, typically corresponding to an insertion width of a SmartMedia™ Card 60b. The socket 128a also comprises a secondary width 264, typically corresponding to an insertion width of either an MMC card 60c or an SD card 60d, and a secondary height 267, typically corresponding to an insertion height of a SmartMedia™ Card 60b. The dimensions of the socket opening the 3-in-1 multiple format flash media adapters 260a,260b shown in FIG. 16 and FIG. 17 are preferably based upon the card dimensions for a SmartMedia™ card 60b (35 mm×45 mm×0.76 mm), the card dimensions for an SD Card 60d (24 mm×32 mm×2.1. mm), and the card dimensions for an MMC card 60c (24 mm×32 mm×1.4 mm).

Figure 19:
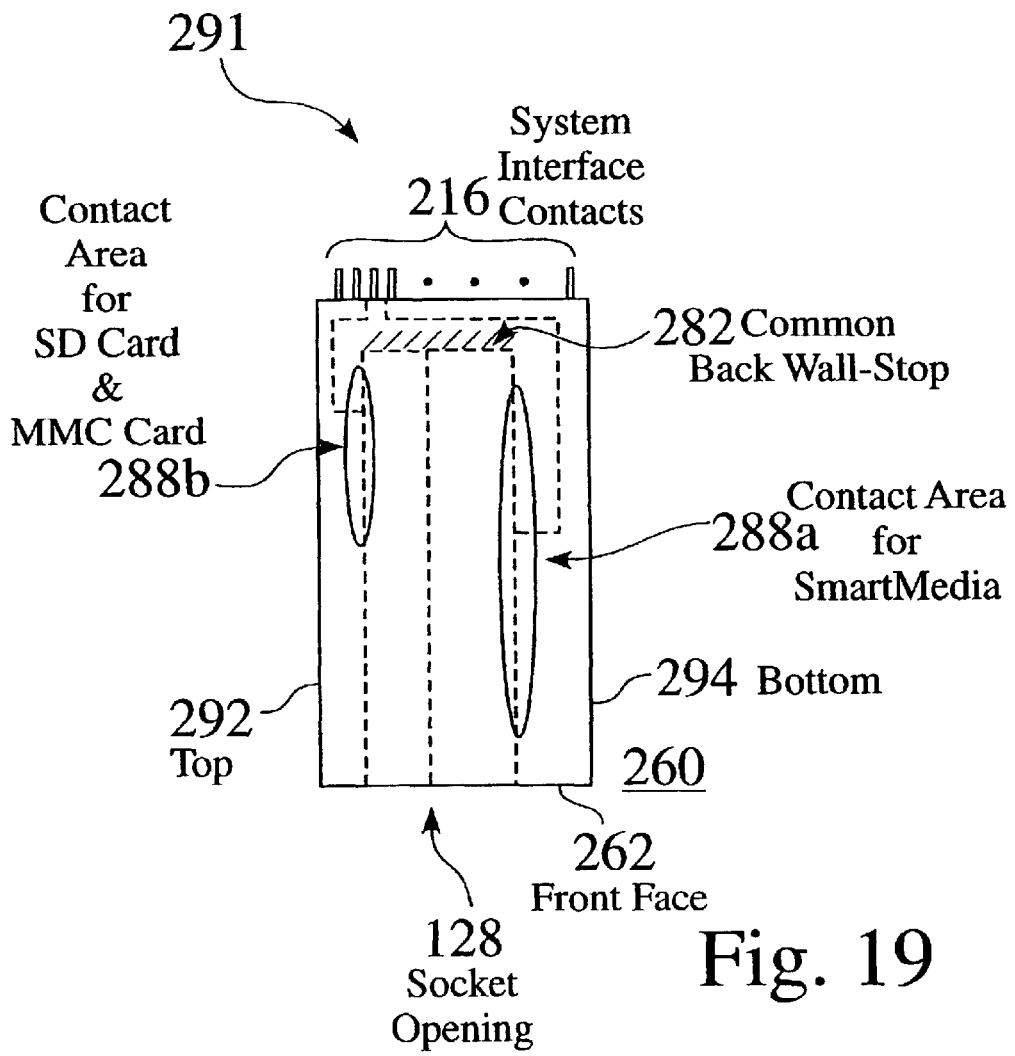
FIG. 19 is a side schematic view of a passive adapter for sensing flash media having different formats, comprising a common back wall-stop.

The socket 228b in FIG. 17 further comprises socket opening offsets 272a,272b, such that the region defined for insertion of either an MMC card 60c or an SD card 60d is generally located in the central region of the socket opening 128. The socket 228b in FIG. 17 provides a secure fit on both left and right sides of inserted SmartMedia™ cards 60b, to guarantee appropriate contact to the SmartMedia™ contact area 288a (FIG. 19).

Alternate embodiments of the socket 128 provide a variety of configurations for the opening areas for media having different formats 60, such as media formats 60b,60c,60d. For example, the SmartMedia™ opening may alternately be located closer to the top 292 of the front face, such that there is opening area for an SD Card 60d or an MMC card 60c "below" the opening for a SmartMedia™ card 60b. As well, alternate embodiments of the socket 128 provide a variety of connector face heights 266, clearance tolerances, and card warp-edge tolerances, typically based upon the intended implementation.

The multiple format flash media adapter 260 provides a common back wall 282 (FIG. 18, FIG. 19, FIG. 20), which provides a reliable connection to wide variety of digital flash media cards 60, comprising any of a SmartMedia card 60b, an MultiMediaCard (MMC) 60c, or an SD Card 60d.

Figure 20:
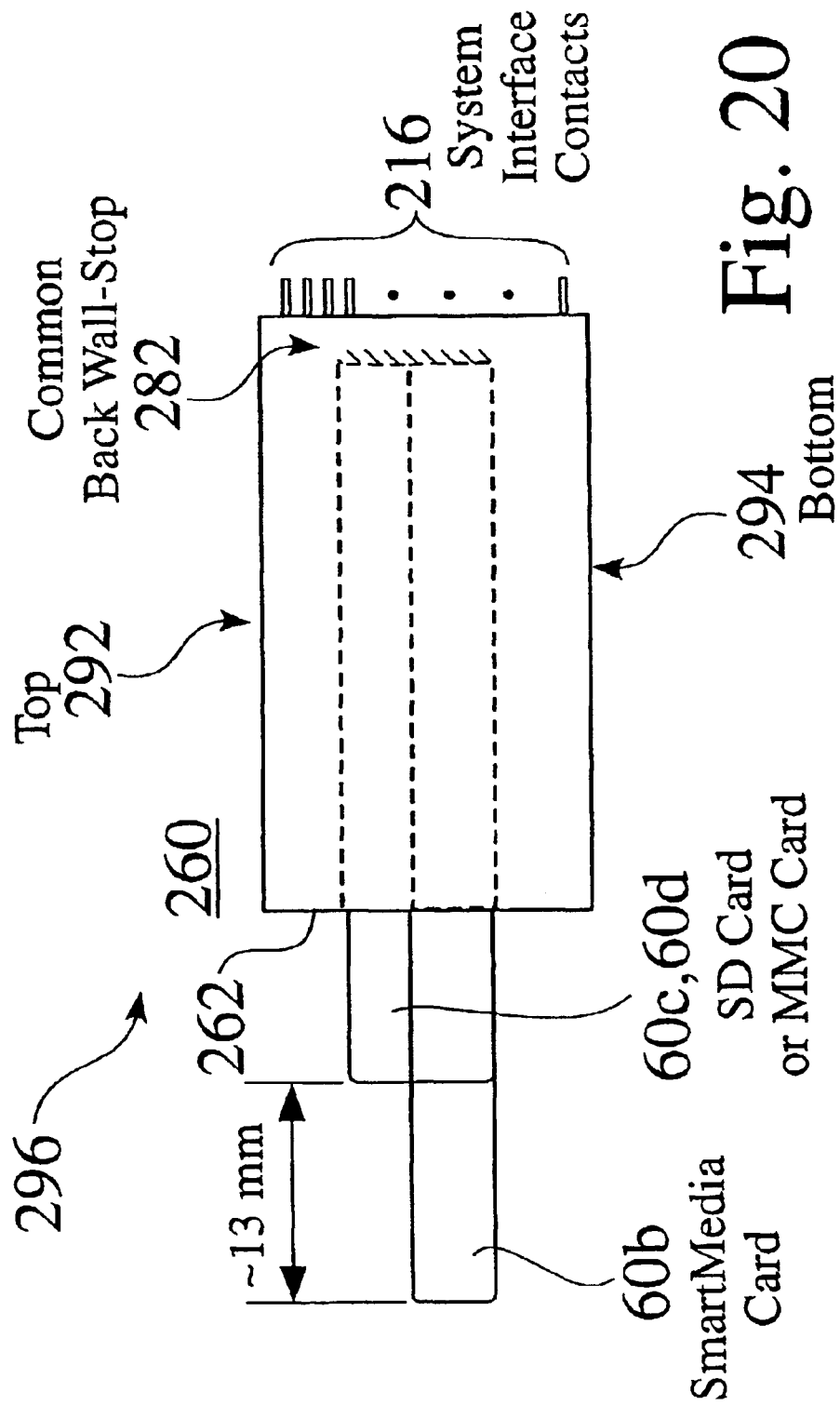
FIG. 20 is a side schematic view of card insertion within a passive adapter for sensing flash media having different formats, comprising a common back wall-stop.

FIG. 18 is a top schematic view 280 of a multiple format flash media adapter 260 for sensing flash media having different formats 60b,60c,60d, comprising a common back wall-stop 282. FIG. 19 is a side schematic view 291 of a multiple format flash media adapter 260 for sensing flash media having different formats 60b,60c,60d, comprising a common back wall-stop 282. FIG. 20 is a side schematic view 296 of card insertion within a multiple format flash media adapter 260 for sensing flash media having different formats 60b,60c,60d, comprising a common back wall-stop 282. The multiple format flash media adapter 260 interfaces to a wide variety of digital flash media cards 60, comprising any of a SmartMedia™ card 60b, an MultiMediaCard (MMC) 60c, or an SD Card 60d. The multiple format flash media adapter 260 provides robust connections between a flash media card 60b,60c, or 60d and a electronic system, such as a host system 112, through a common socket opening 128.

The multiple format flash media adapter 260 provides a reliable 3-in-1 socket design 128, which successfully interfaces to flash media cards 60b,60c,60d, and provides appropriate connections for each of the media formats. In the flash media adapter 220 seen in FIG. 15, a staggered back wall 232a,232b inherently allows a stuck position 252 of an MMC card 60c under the back-wall 232a,232b. In contrast, as seen in FIG. 18, FIG. 19, and FIG. 20, the common back wall 282 of the multiple format flash media adapter 260 is shared for all media 60b,60c, or 60d. The common, shared back wall-stop 282 for all insertable media 60b,60c, 60d prevents media 60, such as an MMC card 60c, from being improperly positioned or stuck 252 within the connector 260.

Alternate embodiments of the multiple format flash media adapter 260 provide a variety of connector depths and/or common wall-stop depths, i.e. the media insertion depth, based upon the implementation. In some preferred embodiments of the multiple format flash media adapter 260, the media insertion depth is sufficiently large to provide connection to the SmartMedia write-protect area 290 (FIG. 18).

As seen in FIG. 18 and FIG. 19, the SmartMedia™ contact area 288a is generally located near on the bottom 294 of the socket 128, while the SD Card and MMC contacts 288b are generally located on the top 288 of the socket 128. Alternate embodiments of the multiple format flash media adapter 260 provide appropriate contact areas 288 to correspond to the flash media 60. For example, for embodiments of the multiple format flash media adapter 260 in which the opening for either an SD Card 60d or an MMC card 60c is "below" the SmartMedia opening 268a, then the contact area 268b for SD Card and MMC cards 60 is typically located on the bottom 294 of the socket 128.

The multiple format flash media adapter 260 shown FIG. 20 allows one type of media to be inserted within the socket 128 at any one time. An inserted SmartMedia™ card 60b extends further from the front face of the socket 128 than an inserted SD Card 60d or MMC card 60c, due to depth of the common wall-stop 282. For example, since a SmartMedia™ card 60b is 45 mm in length, and both an SD Card 60d and an MMC card 60c are 32 mm in length, a SmartMedia card 60b extends approximately 13 mm further from the front-face 262 than either an SD Card 60d or an MMC card 60c.

The multiple format flash media adapter 260 alternately comprises a wide variety of insertion mechanisms 131 and removal mechanisms 133 (FIG. 6), such as but not limited to push/push operation, manual insertion and removal operation, or for ejection removal operation. Furthermore, alternate embodiments of the multiple format flash media adapter 260 comprise a variety of socket depths, media insertion depths, front face designs, and/or contact positions. As well, alternate embodiments of the multiple format flash media adapter 260 readily provide similar connections for other installable media or devices.

Figure 21:
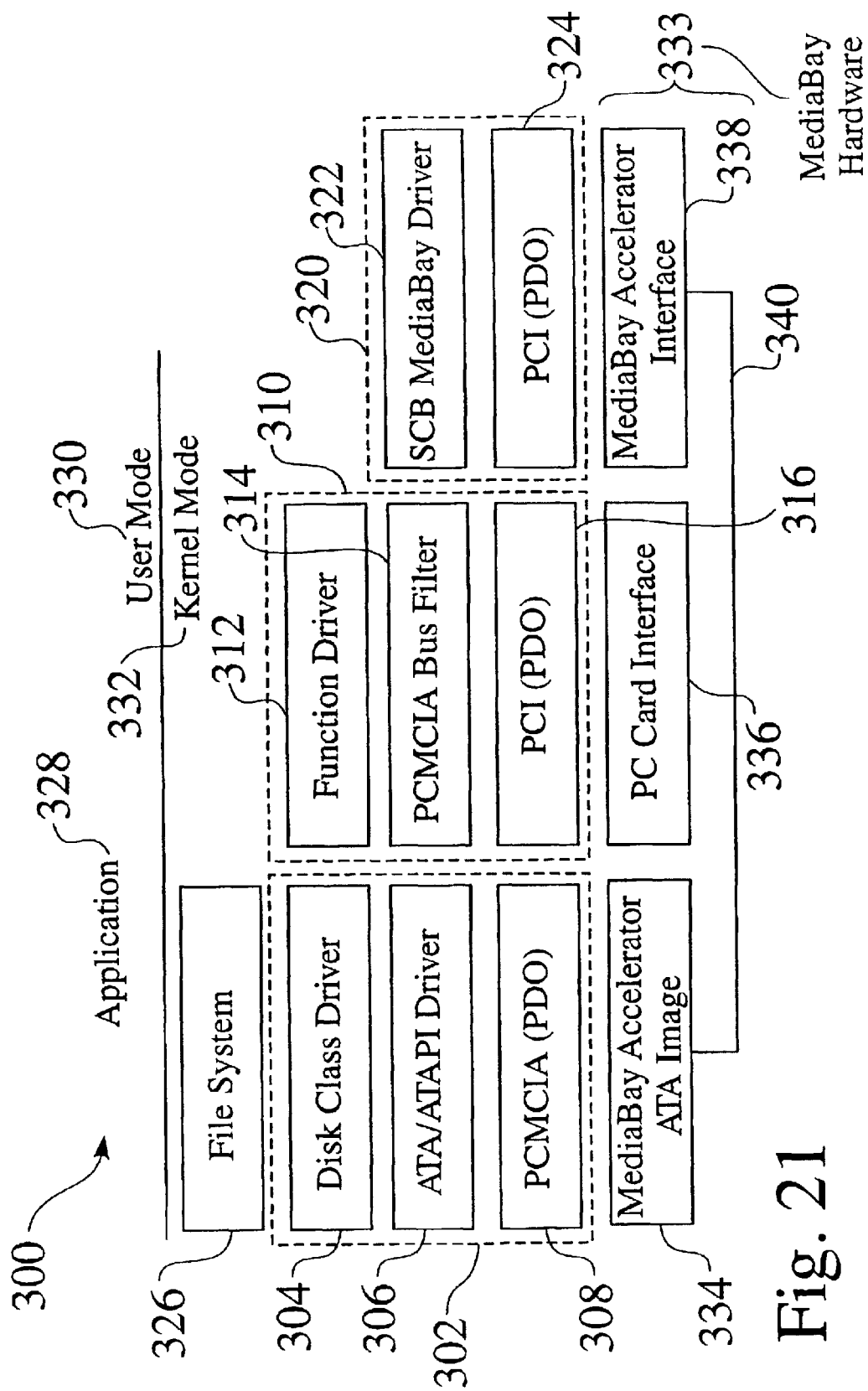
FIG. 21 is a functional block diagram of a software stack for an SCB MediaBay system.

Media Bay Accelerator. FIG. 21 is a functional block diagram 300 of a software stack which illustrates how SCB Media Bay Accelerator driver software 322 is integrated within an operation system storage stack, such as for a Windows™ operating system, by Microsoft, Inc., of Redmond, Wash. Operating systems keep track of resources, such as I/O ports, IRQ interrupts, and associated low-level device drivers, which are associated with hardware components within a PC system. The structure which comprises these entries is typically referred to as a hardware tree. An entry within the hardware tree is typically referred to as a device node.

As seen in FIG. 21, a first device node 302 comprises a disk class driver 304, an ATA/ATAPI driver 306, and a PCMCIA (PDO) driver 308. A physical device object (PDO) typically describes the individual hardware components for which a resource requirements list is maintained within the hardware tree. Therefore, there is a one-to-one relationship between the PDO driver 308 and the device node 302.

The bus drivers 308,316,324 are associated with communication with the hardware components. For example, communication with the Media Bay accelerator ATA image 334 is provided through PCMCIA mechanisms. However, since the PCMCIA bus controller hardware connects to the system through the PCI bus, the PCMCIA management software 314 uses PCI mechanisms to communicate with the hardware register interface 336 which controls PCMCIA plug-and-play connectivity 336.

A second device node 310 comprises a function driver 312, a PCMCIA bus filter 314, and a PCI(PDO) 316. A third Media Bay accelerator device node 320 comprises the smart card bus (SCB) MediaBay Accelerator driver 322, as well as a PCI pin device object (PDO) 324.

As seen in FIG. 21, the Media Bay accelerator hardware 333 comprises a Media Bay accelerator ATA Image 334, a PC Card interface 336, a Media Bay accelerator Interface 338, and associated Media Bay hardware connections 340. While the Media Bay accelerator system 350 comprises hardware 333, the functionality of the Media Bay accelerator system 350 is preferably implemented as an enhancement to the existing microprocessor, PC card controller, and hardware of a host system 114.

The enhanced SCB Media Bay PC Card controller 114 connects to the PCI bus, preferably as a logic PCI device Function 0. The PCI bus driver 308, which is implemented through hardware components in the host chipset, enumerates this physical device object, and determines that the object is a PCMCIA controller, the bus driver loads the PCMCIA bus filter 314 and function driver 312 that provides PCMCIA services, as well as power management for the SCB MediaBay PC controller functions. In one embodiment, the second device node 310, e.g. such as the device node of the OZ711Ex, is embedded within the SCB MediaBay chip 114, which includes the Media Bay accelerator ATA image 334, the PC Card interface 336, and the Media Bay accelerator interface 338, as seen in FIG. 21.

The SCB Media Bay accelerator 322 connects to the PCI bus physically as well as logically, typically as PCI Device Function 1. When the PCI bus driver 308 enumerates this PCI physical device object, and determines that the device object is the Media Bay accelerator driver 322, the bus driver 308 loads the Media Bay accelerator driver 322.

When a media card 60 is plugged in, through an adapter 120,260, the PCMCIA function driver 312 loads the ATA driver 306, which provides a disk storage interface. The ATA driver 306 communicates with the ATA register set that is implemented as an ATA register set image 334 in the Media Bay accelerator function. As seen in FIG. 21, the first device node 302 is the device node for the PCMCIA reader hardware, which is embedded in the SCB MediaBay chip 114.

The operating system for the host system 112, such as a Windows™ operating system, does not know that the SCB media bay 322 comprises the flash media reader logic, since the operating system does not determine that the active electronics reside in the controller 114, and not on the adapter 120,260.

As seen in FIG. 21, the ATA Image provided by the MediaBay Accelerator 322 is accessed by the Windows-provided ATA/ATAPI disk storage stack. The ATA driver 306 is not aware of the back-end processing done by the SCB Media Bay driver 322. The SCB Media Bay driver 322 accesses the ATA image 334, through the Media Bay Accelerator register interface 338. The ATA image 334 can either be accessed by the IO addresses typically used by the ATA driver 306, or alternately by memory addresses that the SCB MediaBay driver 322 uses, through the accelerator interface 338. Through the ATA image 334, the SCB Media Bay driver 322 obtains ATA-type commands and parameters. The SCB Media Bay driver 322 translates these commands and parameters into new commands and parameters, which are relevant to the flash media interfaces. When the translation is complete, the SCB Media Bay driver 322 communicates the completion to the ATA driver 306, through the shared ATA Image 334.

The MediaBay Accelerator 332 function does not change how the PC Card controller 114 functions in device fit into the Windows PCMCIA software stack, through the PCMCIA bus filter 314 and PC card interface 336.

Figure 22:
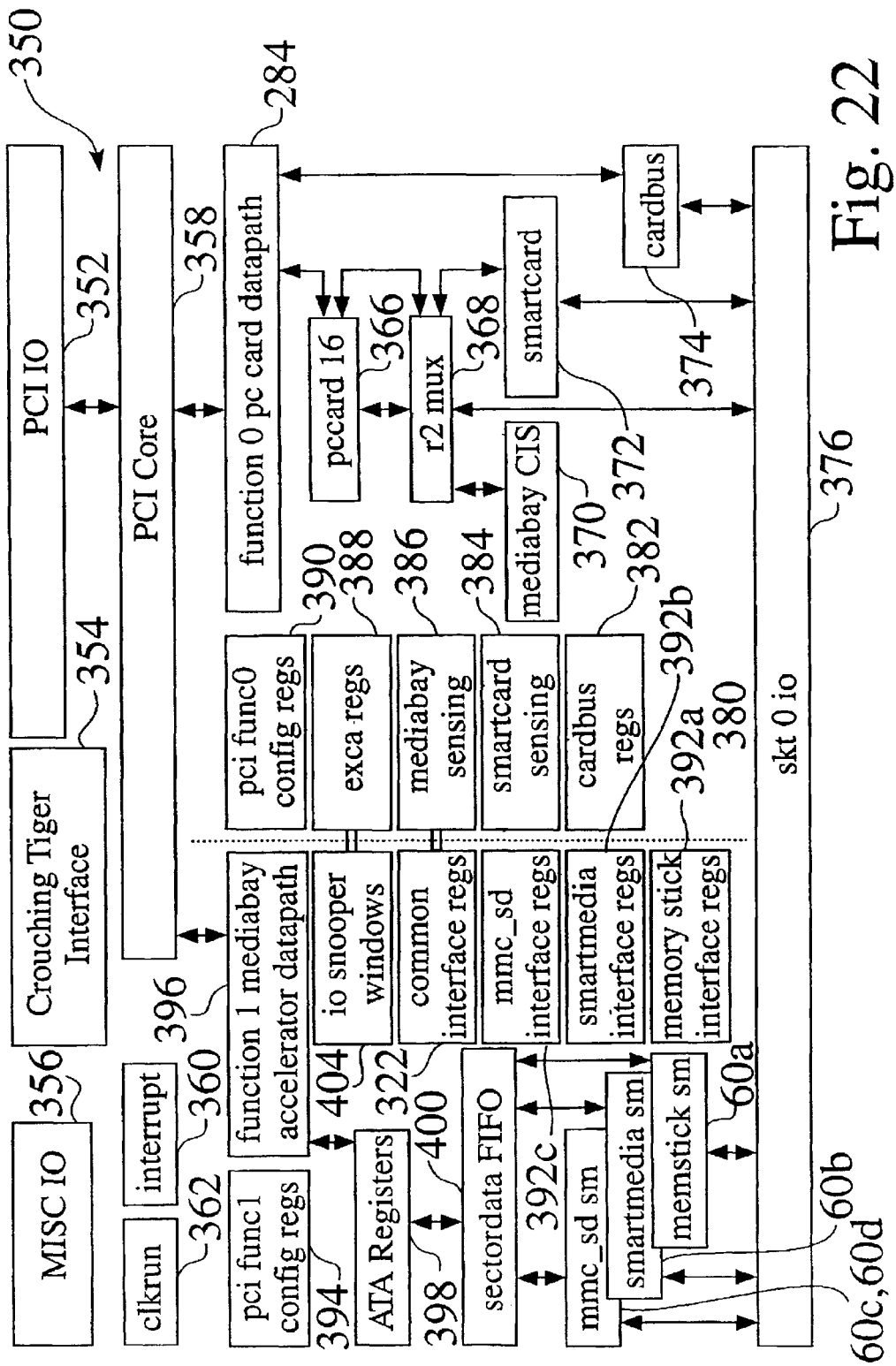
FIG. 22 is a schematic block diagram of SCB Media Bay hardware architecture.
Figure 23:
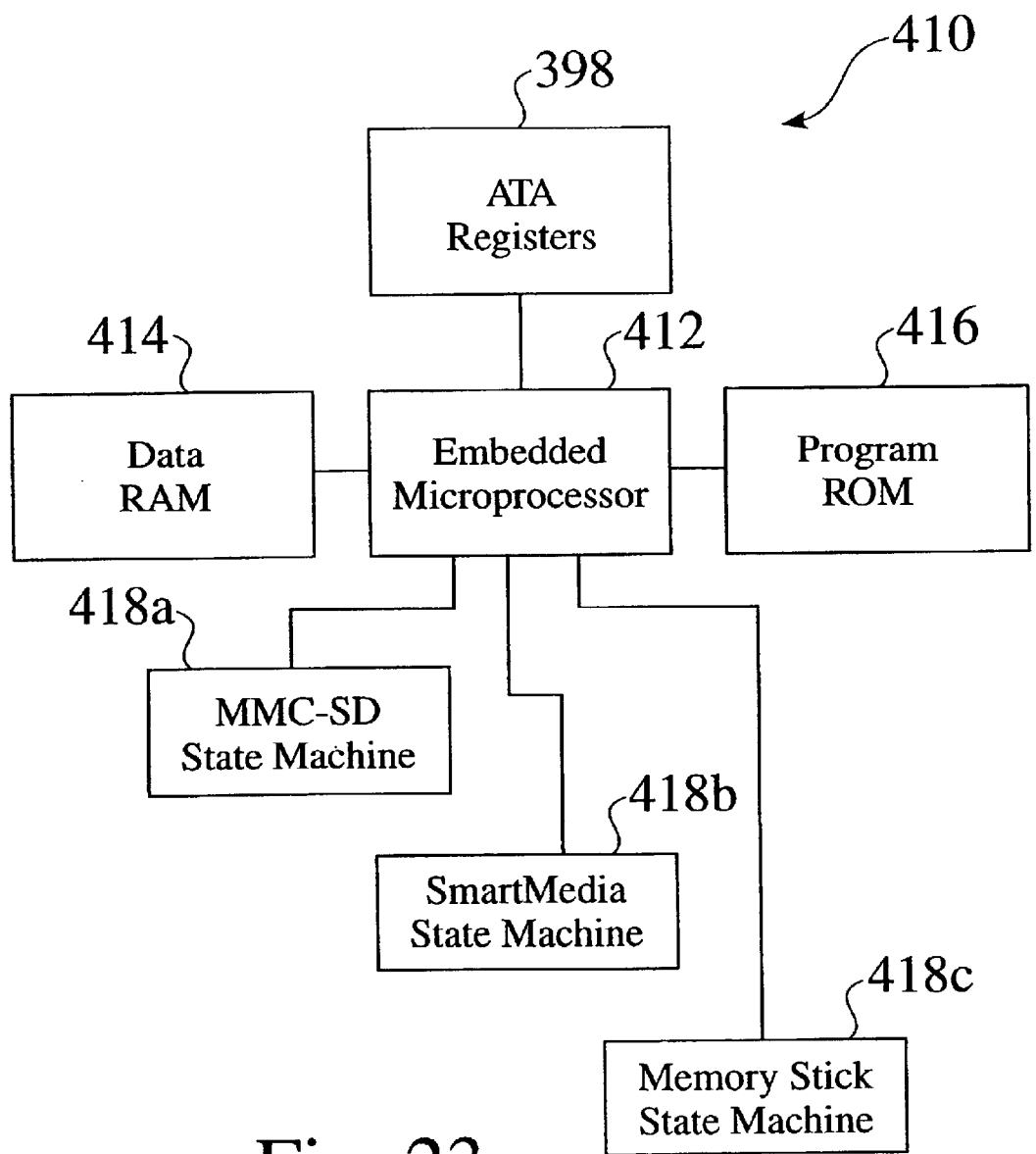
FIG. 23 is a partial schematic block diagram of an SCB Media Bay system integrated within host hardware architecture.

Media Bay Accelerator Hardware Architecture. FIG. 22 is a schematic block diagram of SCB MediaBay accelerator hardware architecture 350. Existing functionality of the operating system typically comprises a PCI I/O 352, Misc I/O 356, and a PCI core 358 in communication with the PCI I/O 352. FIG. 23 is a partial schematic block diagram 410 of an SCB Media Bay system integrated within host hardware architecture.

As seen in FIG. 22, the Media Bay Accelerator 322 comprises MediaBay Accelerator functions, such as PCI fund configuration registers 394, functions media bay accelerator data path 396, ATA registers 398, and sector data FIFO 400. The Media Bay Accelerator 322 also comprises common interface registers 402, I/O snooper windows 404, as well as registers 392 for cards 60 having different formats, such as a Memory Stick™ interface register 392a for a connected Memory Stick™ card 60a, a SmartMedia™ interface register 392b for a connected SmartMedia™ card 60b, and/or a MMC/SD interface register.

A MediaBay adapter is reported as a 16-bit PC Card ATA device. In one embodiment of the architecture 350, the MediaBay CIS identifies a Media Bay adapter 120,260 as a standard ATA compatible device, such that the ATA disk driver 306 provided by the operating system is loaded.

The Media Bay accelerator 322 typically comprises a PCI functional enhancement to a microprocessor 412 for a host system 112. A Media Bay accelerator driver 322, referred to as mediabay.sys, is loaded to the operating system. The Media Bay accelerator driver 322 provides the Media Bay accelerator functionality, and handles low-level tasks that the firmware in a typical ATA adapter performs. For example, the Media Bay accelerator 322 handles PCI INTA# interrupts generated by the function, but does not hook into the Windows storage class.

The mediabay.sys driver 322 receives ATA command information through the ATA register set 398, which provides the ATA image 334 to the system. While the PCMCIA system considers access to the ATA registers 398 is provided by function 0 data path 364; the PCI function 1 configuration register 394 is aware of the ExCA windows and window enables 398, and "snoops" or steals 404 the PCI cycles to the ATA registers 398.

The 16-bit PC Card function 0 data path 364 does not claim these cycles, because the data path 364 is designed to disable ExCA windows 0/1 when a Media Bay adapter is inserted. Since the enable bits are set, the operating system believes the PCMCIA controller handles these cycles. Function 1 therefore generates the INTA# required for mediabay.sys 322, and notifies the Function 0 data path 364 when to generate an IRQ request for the standard ATA disk driver.

The Media Bay architecture 350 therefore provides an ATA image in a new PCI Function, even though the operating system the access to the ATA registers 394 is via the PCMCIA function. Since the Media Bay accelerator system 350 is preferably a fully integrated solution, i.e. being integrated with the existing microprocessor and hardware of a host system 112, power management concerns are minimal.

Another advantage of the Media Bay accelerator system 350 is the increased speed of data transfer, since data transfer is performed entirely over the PCI system, thereby avoiding delay inherent to a standard 16-bit PCMCIA path.

As seen in FIG. 22, the Media Bay accelerator system 350 does not require dedicated hardware within a host system, such as a dedicated microprocessor, or associated RAM and ROM, since the system 350 can be implemented with the microprocessor of the host system 112. For example, as seen in FIG. 23, the Media Bay accelerator system 350 is embedded within a host microprocessor 412, having associated data RAM 414, program ROM 416, and ATA registers 398. The embedded Media Bay accelerator system 350 is readily connected to media cards 60, through media state machines 418, such as through an MMC-SD state machine 418*a*, a Smart media state machine 418*b*, and/or a Memory Stick state machine 418*c*.

SCB Media Bay Operation for Flash Media. Upon boot-up of the host system 112, the PCI function, indicated by PCI configuration registers 394, e.g. such as function data path 396 (FIG. 22), and the Media Bay accelerator driver 322 (FIG. 21) are loaded.

SmartMedia, Memory Stick, MMC, or SD Card Insertions. Upon connection of a media card 60 to the host system 112, through a Media Bay flash media adapter, the adapter 120,260 is typically reported as a 3.3V 16-bit PC Card ATA device. CIS details are typically provided by the Media Bay CIS 370, which intercepts attribute memory reads from a Media Bay flash media adapter 120. PCMCIA services 308 then powers the card socket 116, allocates the appropriate ExCA I/O windows, configures the PC card controller 114 to generate the appropriate IRQ, and loads the ATA disk driver 306.

The ATA driver begins I/O accesses to the ATA registers that control flash media storage. These ATA registers are mapped by PCMCIA service using EXCA I/O windows. The Media Bay Accelerator 322 is aware of the ExCA I/O window maps and window enables, and claims, i.e. snoops, or steals, the PCI cycles with the register addresses. The 16-bit PC card function does not claim these cycles, since the PC Card function ignores ExCA windows 0/1 accesses when a Media Bay adapter 120,260 is inserted.

When the ATA command register 398 is written, the Media Bay system 350 generates INTA#, through the Media Bay driver 322. The Media Bay accelerator driver 322 obtains the ATA command information through the ATA register set that provides the ATA image to the system. Command type, e.g. such as Identify Drive, and Read Sector, and parameters are acquired by the Media Bay accelerator driver 322, which handles all lower-level tasks that translate from the ATA-type interface to the flash media interfaces 336. The flash media interfaces 336 are accessed through the Media Bay interface registers 392, which retain all control and status necessary between the driver 322 and the media card 60, such as to determine which type of flash media 60, e.g. a Memory Stick™ card 60*a*, a Smart Media™ card 60*b*, an MMC card 60*c*, or an SD card 60*d*, is inserted through the card adapter 120,260.

When the ATA command is complete, the Media Bay accelerator driver 322 indicates the completion, through the ATA register image 334, and indicates to the function 0 data path 364 to issue the ATA IRQ interrupt.

The MediaBay Accelerator system 350 provides an ATA image in a new PCI function, while the host operating system considers that the access to the ATA registers is via the PCMCIA function. The MediaBay Accelerator system 350 provides increased speed, since the ATA accesses are handled completely by the PCI, while the relatively slow 16-bit PCMCIA accesses are preferably completely bypassed.

While the enhanced protocol conversion system 70,90, 110 is disclosed above as an protocol control and conversion system for a computer platform, the protocol conversion system 70,90,110 is readily adapted for a wide variety of processing platforms and devices. As well, the protocol control and conversion system can readily be used for a wide variety of connected end functions, such as media, devices or networks. In addition, alternate embodiments of the enhanced PC card controller 114 may provide other enhancements between a host system 112 and external devices 100 connected through the passive adapter 120, such as small form factor IO devices.

Although the enhanced protocol conversion system and its methods of use are described herein in connection with a personal computers and other microprocessor-based devices, such as the apparatus and techniques can be implemented for a wide variety electronic devices and systems, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A process, comprising the steps of:
   providing a platform central processing unit;
   providing a controller converter device comprising a first interface and first protocol element in communication with the central processing unit, and a second interface and second protocol element in communication with an end function;
   adding an intermediate electrical interface between the first protocol and the second protocol;
   offloading protocol instructions from the intermediate electrical interface to the platform central processing unit; and
   executing the offloaded instructions at the central processing unit to support the intermediate interface between the first protocol and the second protocol.

2. The process of claim 1, wherein the end function comprises a MEMORY STICK™.

3. The process of claim 1, wherein the end function comprises an SD Memory Card.

4. The process of claim 1, wherein the end function comprises CompactFlash™ media.

5. The process of claim 1, wherein the first electrical interface is shared with the intermediate electrical interface.

6. The process of claim 1, wherein the first electrical interface is a PCI Express interface.

7. The process of claim 1, wherein the intermediate electrical interface is a PCI Express interface.

8. The process of claim 1, wherein the second electrical interface is in communication with the end function.

9. The process of claim 1, wherein the end function comprises any function from the group consisting of a disk drive, a storage interface, a network interface, an audio interface, a video interface, an input device interface, a data acquisition interface, a bridge interface, a routing interface, and a wireless connectivity endpoint.

10. The process of claim 1, wherein the intermediate interface further comprises means for forwarding protocol information to the central processing unit.

11. The process of claim 1, wherein the intermediate interface further comprises means for forwarding protocol conversion information to the first protocol element.

12. The process of claim 1, wherein the intermediate interface further comprises means for forwarding protocol conversion information to the second protocol element.

13. The process of claim 1, wherein the central processing unit is a RISC microprocessor.

14. The process of claim 1, wherein the central processing unit is an ARM microprocessor.

15. The process of claim 1, further comprising the step of:
    providing a bus interface between the central processing unit and the first electrical interface.

16. The process of claim 1, further comprising the step of:
    providing a bus interface between the central processing unit and the intermediate electrical interface.

17. The process of claim 1, wherein the second protocol element is SDIO support logic and the second electrical interface is an SDIO electrical interface.

18. The process of claim 17, further comprising the step of:
    connecting an SDIO socket to the SDIO electrical interface.

19. The process of claim 1, wherein the second electrical interface is a SmartMedia™ interface.

20. The process of claim 1, wherein the second electrical interface is an MMC interface.

21. The process of claim 1, wherein the second electrical interface is an SD interface.

22. The process of claim 1, further comprising the step of:
    sensing the presence of a connected end function at the second electrical interface.

23. The process of claim 1, further comprising the step of:
    determining the format of connected end function through the second electrical interface.

24. The process of claim 15, wherein the bus interface is a USB bus.

25. The process of claim 22, wherein the step of sensing the presence of a connected end function comprises determining a logic state through the second electrical interface.

26. The process of claim 22, wherein the step of sensing the presence of an connected end function comprises determining a voltage through the second electrical interface.

27. The process of claim 23, wherein the step of determining the format of the connected end function comprises determining a query logic state associated with the connected end function.

28. A system connectable to an end function, comprising:
    a central platform processing unit;
    a protocol interface comprising a first interface and first protocol element in communication with the central processing unit, and a second interface and second protocol element which is connectable to the end function;
    an intermediate interface between the first protocol element and the second protocol element, the intermediate interface is capable of offloading protocol instruction to the platform central processing unit;
    wherein said central processing unit is capable of executing the offloaded instructions at the central processing unit to support the intermediate interface between the first protocol and the second protocol.

29. The system of claim 28, wherein the end function comprises a MEMORY STICK™.

30. The system of claim 28, wherein the end function comprises an SD Memory Card.

31. The system of claim 28, wherein the end function comprises CompactFlash™ media.

32. The system of claim 28, wherein the first interface is shared with the intermediate interface.

33. The system of claim 28, wherein the first interface is a PCI Express interface.

34. The system of claim 28, wherein the intermediate interface is a PCI Express interface.

35. The system of claim 28, wherein the intermediate interface further comprises means for forwarding protocol information to the central processing unit.

36. The system of claim 28, wherein the intermediate interface further comprises means for forwarding protocol conversion information to the first protocol element.

37. The system of claim 28, wherein the intermediate interface further comprises means for forwarding protocol conversion information to the second protocol element.

38. The system of claim 28, wherein the central processing unit is a RISC microprocessor.

39. The system of claim 28, wherein the central processing unit is an ARM microprocessor.

40. The system of claim 28, further comprising:
    a bus interface between the central processing unit and the first electrical interface.

41. The system of claim 28, further comprising:
a bus interface between the central processing unit and the intermediate electrical interface.

42. The system of claim 28, wherein the second protocol element is SDIO support logic and the second electrical interface is an SDIO electrical interface.

43. The system of claim 40, wherein the bus interface is a USB bus.

44. The system of claim 42, further comprising:
an SDIO socket connected to the SDIO electrical interface.

45. The system of claim 42, further comprising:
an SDIO compatible device connected to the SDIO electrical interface.

* * * * *